(12) United States Patent
Wang et al.

(10) Patent No.: US 12,022,000 B2
(45) Date of Patent: Jun. 25, 2024

(54) METHOD FOR INFORMATION PROCESSING IN DIGITAL ASSET CERTIFICATE INHERITANCE TRANSFER, AND RELATED DEVICE

(71) Applicant: Tencent Technology (Shenzhen) Company Limited, Guangdong (CN)

(72) Inventors: Dongyan Wang, Shenzhen (CN); Maocai Li, Shenzhen (CN); Bo Li, Shenzhen (CN); Haitao Tu, Shenzhen (CN); Zongyou Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 589 days.

(21) Appl. No.: 17/237,773

(22) Filed: Apr. 22, 2021

(65) Prior Publication Data
US 2021/0243037 A1    Aug. 5, 2021

Related U.S. Application Data

(63) Continuation of application No. PCT/CN2020/077388, filed on Mar. 2, 2020.

(30) Foreign Application Priority Data

Mar. 8, 2019  (CN) .......................... 201910177252.4

(51) Int. Cl.
*H04L 9/40*    (2022.01)
*G06Q 50/18*    (2012.01)
(Continued)

(52) U.S. Cl.
CPC ......... *H04L 9/3247* (2013.01); *G06Q 50/186* (2013.01); *H04L 9/0825* (2013.01);
(Continued)

(58) Field of Classification Search
CPC ... H04L 9/3247; H04L 9/0825; H04L 9/3263; H04L 9/50; H04L 2209/72; G06Q 50/186
See application file for complete search history.

(56) References Cited

U.S. PATENT DOCUMENTS

| 10,055,735 B2 | 8/2018 | Dixon et al. |
| 2002/0029337 A1 | 3/2002 | Sudia et al. |
| (Continued) | | |

FOREIGN PATENT DOCUMENTS

| CN | 103295126 A | 9/2013 |
| CN | 105610578 A | 5/2016 |
| (Continued) | | |

OTHER PUBLICATIONS

International Search Report and Written Opinion for international application No. PCT/CN2020/077388 dated Jun. 2, 2020, 11 p, in Chinese language.

(Continued)

*Primary Examiner* — Thaddeus J Plecha
(74) *Attorney, Agent, or Firm* — Crowell & Moring

(57) ABSTRACT

This application provides an information processing method in digital asset certificate inheritance transfer, and a related apparatus. The method includes: obtaining a will of a user; and triggering, in response to that a signature made on the will by using a public key of the authoritative entity node is successfully verified by using a private key of the authoritative entity node, transmission of a signature made on at least one digital asset certificate in the will by using a public key of a corresponding inheritor personal security kernel node to the inheritor personal security kernel node corresponding to each inheritor personal security kernel node identifier in the will. In the embodiments of this application, the digital asset certificates of the user are uniformly maintained.

20 Claims, 10 Drawing Sheets

(51) Int. Cl.
  *H04L 9/08* (2006.01)
  *H04L 9/32* (2006.01)
  *H04L 9/00* (2022.01)
(52) U.S. Cl.
  CPC .............. *H04L 9/3263* (2013.01); *H04L 9/50* (2022.05); *H04L 2209/72* (2013.01)

(56) References Cited

U.S. PATENT DOCUMENTS

| | | | |
|---|---|---|---|
| 2008/0167994 A1 | 7/2008 | Li et al. | |
| 2013/0226810 A1 | 8/2013 | Moffett | |
| 2014/0025591 A1* | 1/2014 | Villa, III | G06Q 10/10 |
| | | | 705/312 |
| 2017/0301048 A1* | 10/2017 | Turek | G06Q 10/10 |
| 2018/0082391 A1* | 3/2018 | Brody | G06Q 20/32 |
| 2018/0205546 A1 | 7/2018 | Haque et al. | |
| 2020/0057871 A1* | 2/2020 | Hartley | G06F 40/174 |

FOREIGN PATENT DOCUMENTS

| | | |
|---|---|---|
| CN | 105809062 A | 7/2016 |
| CN | 107767267 A | 3/2018 |
| CN | 108154439 A | 6/2018 |
| CN | 108171609 A | 6/2018 |
| CN | 108460596 A | 8/2018 |
| CN | 108809630 A | 11/2018 |
| CN | 109063084 A | 12/2018 |
| CN | 109345259 A | 2/2019 |
| CN | 110245940 A | 9/2019 |
| CN | 110766405 A | 2/2020 |
| WO | WO 2008/094328 A2 | 8/2008 |
| WO | WO 2020/182005 A1 | 9/2020 |

OTHER PUBLICATIONS

First Office Action and Search Report for Chinese application No. CN 201910177252.4 dated Apr. 9, 2021, 6p, in Chinese language.
Concise Explanation of the Relevance for the International Written Opinion of PCT/CN2020/077388 and the First Office Action and Search Report for CN201910177252.4, 1p.
English language translation of the International Search Report for priority application No. PCT/CN2020/077388, mailed Jun. 2, 2020, 3p.

* cited by examiner

METHOD FOR INFORMATION PROCESSING IN DIGITAL ASSET CERTIFICATE INHERITANCE TRANSFER, AND RELATED DEVICE

RELATED APPLICATIONS

This application is a continuation of PCT Application No. PCT/CN2020/077388, titled "METHOD FOR INFORMATION PROCESSING IN DIGITAL ASSET CERTIFICATE INHERITANCE TRANSFER, AND RELATED DEVICE" and filed with the China National Intellectual Property Administration on Mar. 2, 2020, which claims priority to Chinese Patent Application No. 201910177252.4, entitled "INFORMATION PROCESSING METHOD IN DIGITAL ASSET CERTIFICATE INHERITANCE TRANSFER, AND RELATED APPARATUS" and filed with the China National Intellectual Property Administration on Mar. 8, 2019. The above applications are incorporated herein by reference in their entireties.

TECHNICAL FIELD

This disclosure relates to the field of user identity information technologies, and specifically, to an information processing technology in digital asset certificate inheritance transfer.

BACKGROUND

In real life, asset transfer is generally performed according to physical asset certificates. With popularization of the Internet, more digital asset certificates are circulating on the Internet more rapidly. For example, when people purchase financing products, due to high real-time performance, exchanges no longer provide physical certificates by default. The storage and transfer of assets generally require login onto different asset issuing websites or trading websites, and it is difficult for individual users to centrally manage more digital asset certificates and to ensure the security of the information. Moreover, the digital asset certificates are easily lost as a life cycle of a user ends (for example, as the user passes away). For example, after a user passes away, assets of the user are not known to others. As a result, inheritors cannot inherit or retrieve asset certificates according to the law. A typical example is that after the founder of the QuadrigaCX exchange died of illness accidentally, digital currencies worth about 147 million dollars cannot be withdrawn.

In the related technology, there is no information processing technology that can uniformly manage digital asset certificates of a user and ensure the data security of the digital asset certificates.

SUMMARY

This disclosure provides an information processing technology, which can uniformly maintain digital asset certificates of a user.

According to an aspect of the embodiments of this disclosure, an information processing method in digital asset certificate inheritance transfer is disclosed, including:

obtaining an electronic will of a user, the electronic will including a user personal security kernel node identifier, each inheritor personal security kernel node identifier, a signature made on each digital asset certificate by using a public key of a corresponding inheritor personal security kernel node, and a signature made on the electronic will by using a public key of the authoritative entity node; and triggering, in response to that the signature made on the electronic will by using the public key of the authoritative entity node is successfully verified by using a private key of the authoritative entity node, transmission of the signature made on the each digital asset certificate in the electronic will by using the public key of the corresponding inheritor personal security kernel node to the inheritor personal security kernel node corresponding to the each inheritor personal security kernel node identifier in the electronic will, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

According to an aspect of the embodiments of this disclosure, an authoritative entity node is disclosed, including:

an end of life cycle determining unit, configured to determine that a life cycle of a user ends;

a will obtaining unit, configured to obtain an electronic will of the user, the electronic will including a user personal security kernel node identifier, each inheritor personal security kernel node identifier, a signature made on each digital asset certificate by using a public key of a corresponding inheritor personal security kernel node, and a signature made on the electronic will by using a public key of the authoritative entity node; and a digital asset certificate signature transmission unit, configured to trigger, in response to that the signature made on the electronic will by using the public key of the authoritative entity node is successfully verified by using a private key of the authoritative entity node, transmission of the signature made on the each digital asset certificate in the electronic will by using the public key of the corresponding inheritor personal security kernel node to the inheritor personal security kernel node corresponding to the each inheritor personal security kernel node identifier in the electronic will, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

According to an aspect of the embodiments of this disclosure, an information processing method in digital asset certificate inheritance transfer is disclosed, including:

obtaining, in response to that a digital asset certificate is added to a personal security kernel node of a user, an inheritor personal security kernel node identifier corresponding to the added digital asset certificate and a public key of an inheritor personal security kernel node corresponding to the inheritor personal security kernel node identifier;

signing the added digital asset certificate with the public key of the inheritor personal security kernel node, to obtain a signature made on the added digital asset certificate by using the public key of the corresponding inheritor personal security kernel node;

adding the inheritor personal security kernel node identifier and the signature made on the added digital asset certificate by using the public key of the corresponding inheritor personal security kernel node to an electronic will of the user, the electronic will including a signature made by using a public key of the authoritative entity node;

removing, from the electronic will, the signature made by using the public key of the authoritative entity node; and signing current content in the electronic will with the public key of the authoritative entity node, and putting an obtained signature into the electronic will.

According to an aspect of the embodiments of this disclosure, an authoritative entity node is disclosed, including:

an obtaining unit, configured to obtain, in response to that a digital asset certificate is added to a personal security kernel node of a user, an inheritor personal security kernel node identifier corresponding to the added digital asset certificate and a public key of an inheritor personal security kernel node corresponding to the inheritor personal security kernel node identifier;

a first signature processing unit, configured to sign the added digital asset certificate with the public key of the inheritor personal security kernel node, to obtain a signature made on the added digital asset certificate by using the public key of the corresponding inheritor personal security kernel node;

an adding unit, configured to add, to an electronic will of the user, the inheritor personal security kernel node identifier and the signature made on the added digital asset certificate by using the public key of the corresponding inheritor personal security kernel node, the electronic will including a signature made by using a public key of the authoritative entity node; and a second signature processing unit, configured to remove, from the electronic will, the signature made by using the public key of the authoritative entity node, sign current content in the electronic will with the public key of the authoritative entity node, and put an obtained signature into the electronic will.

Another aspect of this disclosure is about an embodiment of an information processing method, including:

determining, according to an identity of a personal security kernel node of a user, a law corresponding to the identity;

obtaining kinship of the user;

obtaining digital asset certificates of the user;

determining at least one inheritor personal security kernel node identifier respectively corresponding to the digital asset certificates according to the determined law and the kinship;

obtaining at least one public key of at least one inheritor personal security kernel node respectively corresponding to the at least one determined inheritor personal security kernel node identifiers;

signing the digital asset certificates of the user with the at least one public key of the at least one inheritor personal security kernel node to obtain at least one signature; and transmitting the at least one signature to the at least one inheritor personal security kernel node, so that the signature is decrypted by the at least one inheritor personal security kernel node with a private key of the at least one inheritor personal security kernel node to obtain a digest of the digital asset certificate and to obtain the inherited digital asset certificate according to the obtained digest of the digital asset certificate.

According to an aspect of the embodiments of this disclosure, an authoritative entity node is disclosed, including:

a memory, storing computer-readable instructions; and a processor, reading the computer-readable instructions stored in the memory, to perform the method described above.

According to an aspect of the embodiments of this disclosure, a non-transitory computer program medium is disclosed, storing computer-readable instructions, the computer-readable instructions, when executed by a processor of a computer, causing the computer to perform the method described above.

In this embodiment of this disclosure, the digital asset certificates of the user are maintained in the personal security kernel node of the user. The inheritor also has the inheritor personal security kernel node, which maintains the digital asset certificate of the inheritor. The user makes an electronic will in the period of the life cycle. The electronic will includes each inheritor personal security kernel node identifier, a signature made on the each digital asset certificate by using a public key of a corresponding inheritor personal security kernel node, and a signature made on the electronic will by using a public key of the authoritative entity node. When determining that the life cycle of the user ends, the authoritative entity node obtains the electronic will of the user, and verifies, by using a private key of the authoritative entity node, the signature made on the electronic will by using the public key of the authoritative entity node. If the verification succeeds, it indicates that the authoritative entity node is an authoritative entity node designated for executing inheritance before the death of the user. Then, the authoritative entity node triggers transmission of the signature made on each digital asset certificate in the electronic will by using the public key of the corresponding inheritor personal security kernel node to the corresponding inheritor personal security kernel node. Only a real inheritor personal security kernel node can decrypt the signature with the private key of the inheritor personal security kernel node, to obtain the inherited digital asset certificate. The whole inheritance process is automatically executed by a machine, and the reliability of inheritance procedure executed by a third-party authoritative entity node is ensured by using the signature made on the electronic will by using the public key of the authoritative entity node. The digital asset certificate is signed with the public key of the inheritor personal security kernel node, to ensure that only the real inheritor can decrypt the signature, thereby ensuring the security of the digital asset certificate in the inheritance process. In this way, the related digital asset certificate can be still automatically and securely transferred to the inheritor even though the life cycle of the user ends.

Other features and advantages of this disclosure become obvious through the following detailed descriptions, or may be partially learned partially through the practice of this disclosure.

It is to be understood that the foregoing general descriptions and the following detailed descriptions are only exemplary, and cannot limit this disclosure.

BRIEF DESCRIPTION OF THE DRAWINGS

The above and other objectives, features, and advantages of this disclosure will become more apparent from the detailed description of exemplary embodiments of this disclosure with reference to the accompanying drawings.

FIG. 1A is a simplified system architecture diagram. FIG. 1B is a detailed system architecture diagram of a personal security kernel node based on FIG. 1A.

DESCRIPTION OF EMBODIMENTS

Figure 1A:
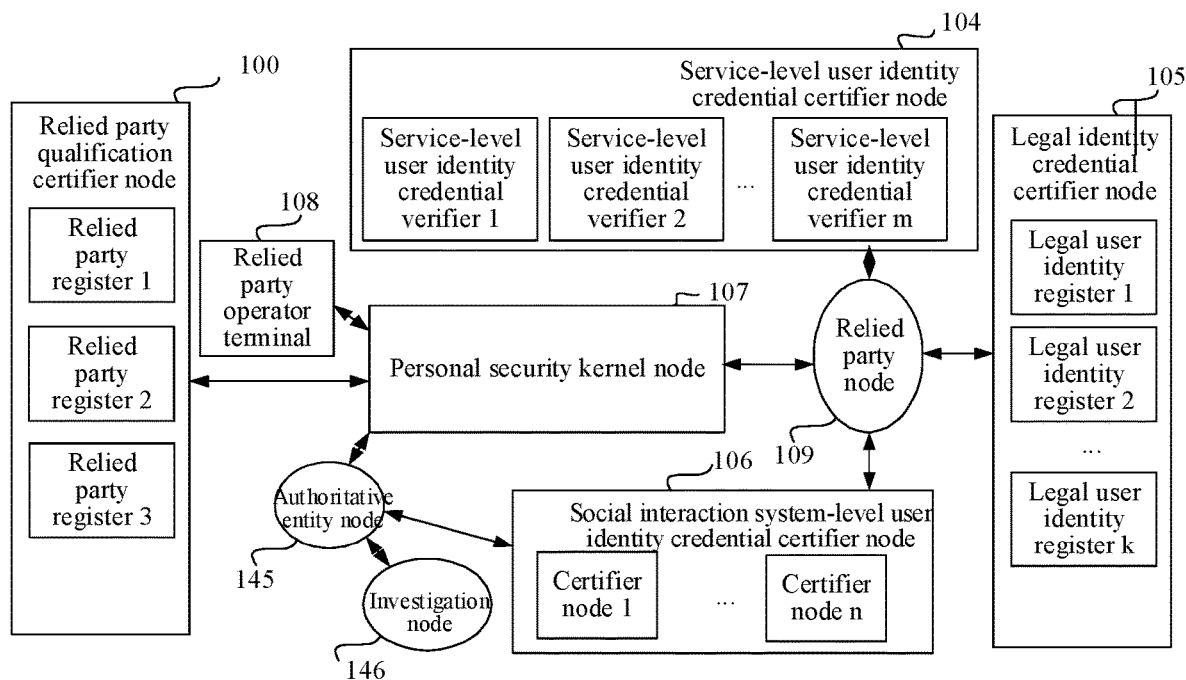
FIG. 1A and FIG. 1B are diagrams of a system architecture applied to an information processing method in digital asset certificate inheritance transfer according to an embodiment of this disclosure.

The exemplary implementations are now described comprehensively with reference to the accompanying drawings. However, the exemplary implementations can be implemented in various forms, and it is not to be understood as being limited to the examples described herein. On the contrary, the exemplary implementations are provided to make the descriptions of this disclosure more comprehensive and complete, and comprehensively convey the idea of the exemplary implementations to a person skilled in the art. The accompanying drawings are merely exemplary illustrations of this disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of this disclosure. However, a person skilled in the art is to be aware that, the technical solutions in this application may be implemented without one or more of the particular details, or another method, unit, or step may be used. In other cases, well-known structures, methods, implementations, or operations are not shown or described in detail, to avoid obscuring the aspects of this disclosure.

Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

A system architecture applied to an information processing method in digital asset certificate inheritance transfer according to an embodiment of this disclosure is first described below with reference to FIG. 1A and FIG. 1B.

As shown in FIG. 1A, the system architecture includes a personal security kernel node 107, a relied party node 109, a relied party qualification certifier node 100, a service-level user identity credential certifier node 104, a legal user identity credential certifier node 105, a social interaction system-level user identity credential certifier node 106, a relied party operator terminal 108, an authoritative entity node 145, and an investigation node 146. All the foregoing nodes are each a blockchain node in a blockchain network. Various data generated by the nodes in this embodiment of this disclosure may be all recorded on a blockchain, or data may be obtained from a blockchain.

The personal security kernel node 107 is a security core that stores digital asset certificates of a user. Each user has a corresponding personal security kernel node 107. The personal security kernel node is a core node that manages the digital asset certificates of the user. The digital asset certificate is an asset that exists in the form of a digital deposit certificate, such as an electronically stored financing product. The digital asset certificate generally refers to an obligation that the relied party node 109 owes to the user after the user and the relied party node 109 perform a specific service. For example, an electronic financing product is embodied as an obligation of paying interest and returning principal to the user owed by the relied party node 109 as a financial management company after the user performs the purchase.

Figure 1B:
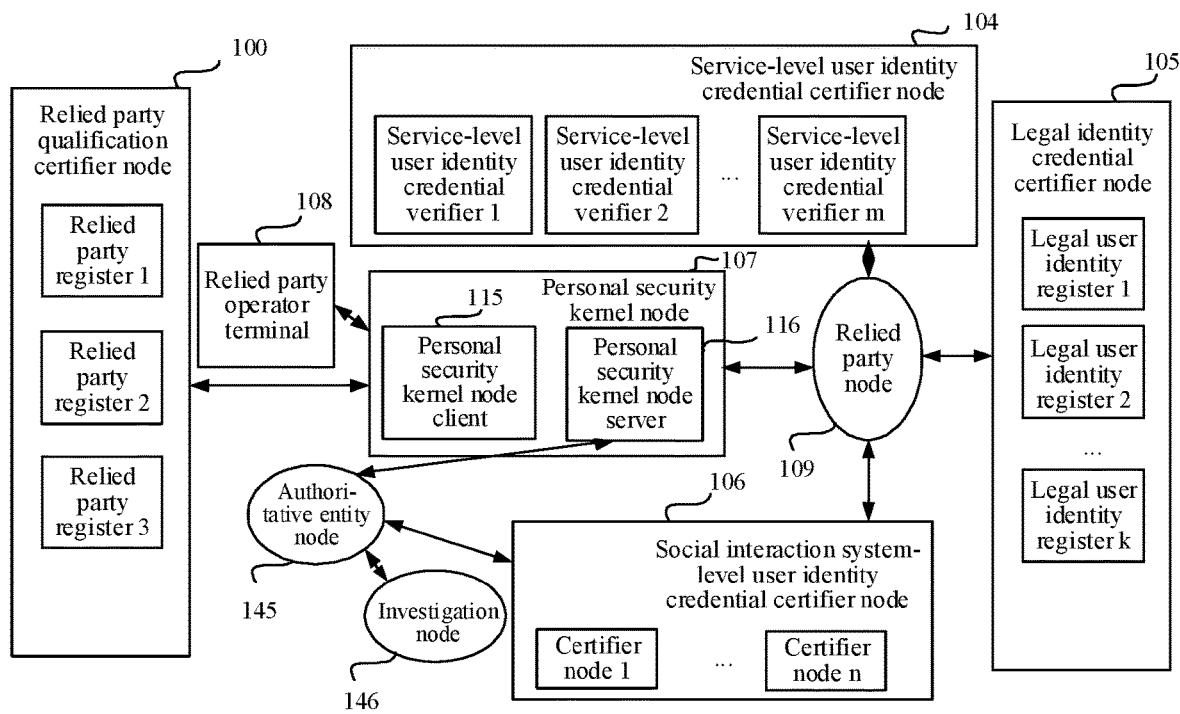

As shown in FIG. 1B, the personal security kernel node 107 may include a personal security kernel node client 115 and a personal security kernel node server 116. The personal security kernel node client 115 is a client that is installed on a user terminal, and is configured to manage user identity assets. The personal security kernel node server 116 is a server that cooperates with the personal security kernel node client 115 to manage the user identity assets.

The relied party node 109 refers to a node of a party on which the performance of the service of the user relies, and generally refers to a server node of the party that is relied on. For example, in a service of purchasing a financing product, the user relies on a financial management company to complete the purchase, and a server of the financial management company is the relied party node 109 in the service of purchasing the financing product.

The relied party operator terminal 108 refers to a terminal used by a service performing operator when the relied party and the user perform a specific service. For example, in the service of purchasing a financing product, a terminal used by a front desk clerk who specifically communicates with the user to purchase the financing product is the relied party operator terminal 108. The legal user identity credential certifier node 105 is a node at which a user legal identity is registered, and the legal user identity credential certifier node 105 is configured to prove that the identity of the user is legal before the service is performed, so that the user can perform the service only after the identity of the user is proved to be legal, so as to obtain a digital asset certificate generated after the user performs the service with the relied party node. The service-level user identity credential certifier node 104 refers to a platform server that has performed a service with the user. Because the platform has performed the service with the user, the platform has verified the identity of the user. Therefore, when a requirement on an identity authentication assurance level is not high, such a platform may indirectly verify the identity of the user. The social-interaction-system-level user identity credential certifier node 106 is a social-interaction-system-level platform server that provides an identity certificate for the user. Platforms such as a WeChat server and a Facebook server have a strong data security protection capability and a universal service capability. It may be considered that such a service provider provides a social interaction system commonly used in the industry. Such identity authentication at an social interaction system level not only uses a centralized pre-issued static legal identity credential as a basis of identity verification, but also combines a multi-dimensional non-centralized identity verification system that makes a confirmation based on a social circle and user activity status, to avoid the risk of identity theft after a static identity verification component issued in a centralized manner is lost. Therefore, the verification assurance level on the user identity is higher before the service is performed, and assurance level evaluation of the social interaction system for identity verification is related to a quantity of users, applications (for example, applets), content, and the like carried by the social interaction system. Because this section is not the focus of this disclosure, details are not described herein. The relied party qualification certifier node 100 refers to a terminal that authenticates whether the relied party has a permission to require the user to provide the user identity credential. Before the service is performed, the identity of the user needs to be certified by the legal user identity credential certifier node 105, or the service-level user identity credential certifier node 104, or the social-interaction-system-level user identity credential certifier node 106, but the relied party qualification needs to be determined by the relied party qualification certifier node 100. All the nodes described above are nodes used before a service is performed to form a digital asset certificates such as an electronic financing product, are not directly related to the embodiments of this disclosure, and therefore are not described in detail.

The authoritative entity node 145 is a terminal used by an authoritative entity (for example, a court) to process a will, for example, a server of the court that processes the will.

The investigation node 146 is a processing terminal of a unit entrusted by an authoritative entity (for example, a judicial institution like a court) to investigate information in inheritance, for example, a terminal of an investigation committee of the court.

Interface diagrams of an application scenario of digital asset certificate inheritance after death of a user to which an information processing method in digital asset certificate inheritance transfer is applied according to an embodiment of this disclosure are described below with reference to FIG. 2A to FIG. 2K.

Figure 2A:
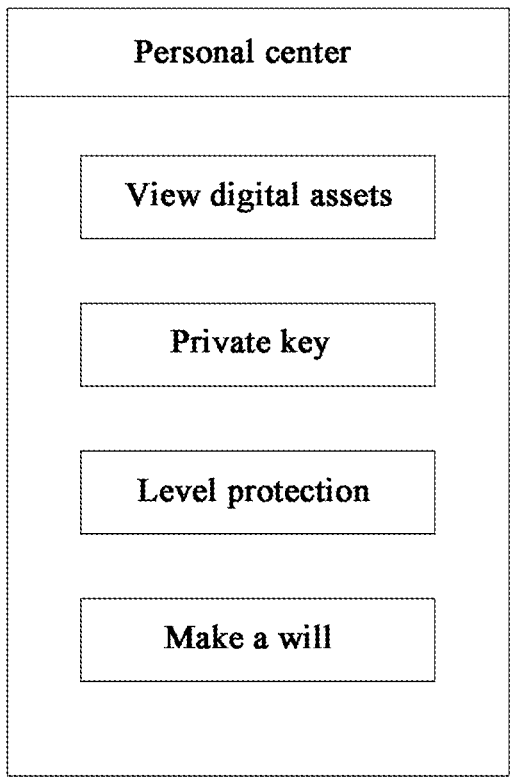
FIG. 2A to FIG. 2K are interface diagrams of an application scenario of digital asset certificate inheritance after death of a user to which an information processing method in digital asset certificate inheritance transfer is applied according to an embodiment of this disclosure.

FIG. 2A is a diagram of a function selection interface displayed by a user terminal associated with a personal security kernel node (Persk) 107. As described above, the personal security kernel node 107 is a device that maintains the digital asset certificates of the user, and may be represented as a client in the user terminal, or a chip of the user terminal, or a chip or a metal patch implanted in a human body or attached to a skin surface, or another unit with storage and computing capabilities. When the personal security kernel node 107 is a client in the user terminal, or a chip of the user terminal, or another unit with storage and computing capabilities, the user terminal associated with the personal security kernel node 107 refers to a user terminal on which a display screen is installed. When the personal security kernel node 107 is a metal patch or a chip implanted in a human body or attached to a skin surface, or another unit with storage and computing capabilities, the user terminal associated with the personal security kernel node 107 refers to a terminal that communicates with the metal patch or the chip, or the another unit with storage and computing capabilities and displays the digital asset certificates stored in the terminal.

Figure 2B:
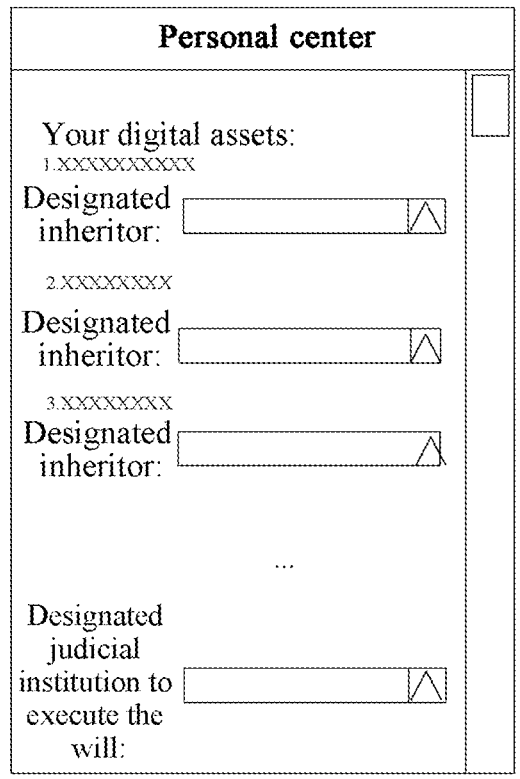

Before the life cycle of the user is ended, the user may select a "Make a will" function option on the interface shown in FIG. 2A, and the interface shown in FIG. 2B is entered.

On the interface in FIG. 2B, all digital asset certificates or various digital asset certificate types of the user are listed, to allow the user fill in an inheritor of each digital asset certificate or each digital asset certificate type and fill in an authoritative entity that executes the will. A role of the authoritative entity that executes the will is to start and witness the process of transferring the digital asset certificates to the designated inheritors after the life cycle of the user ends, functioning as a public trust.

Figure 2C:
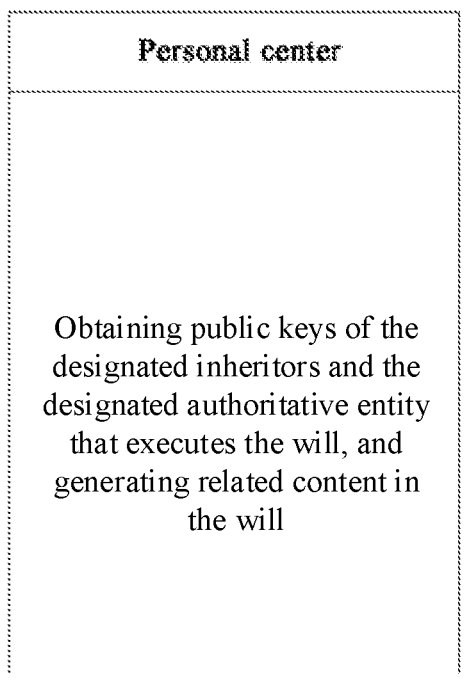

After the user fills the interface in FIG. 2B with the inheritor of each digital asset certificate and the authoritative entity as a witness, as shown in FIG. 2C, public keys of the inheritors and the designated authoritative entity are started to be obtained. The public keys of the inheritors are to ensure the security of the digital asset certificates given to the inheritors after the life cycle of the user ends. The public key of the authoritative entity is to verify whether a third-party authoritative entity that executes the will is the authoritative entity that the user really wants, thereby improving the confidentiality of the will. Because the will of the user is signed with an authoritative entity public key, only a real authoritative entity can decrypt the signature, pass verification, and perform subsequent programs.

Figure 2D:
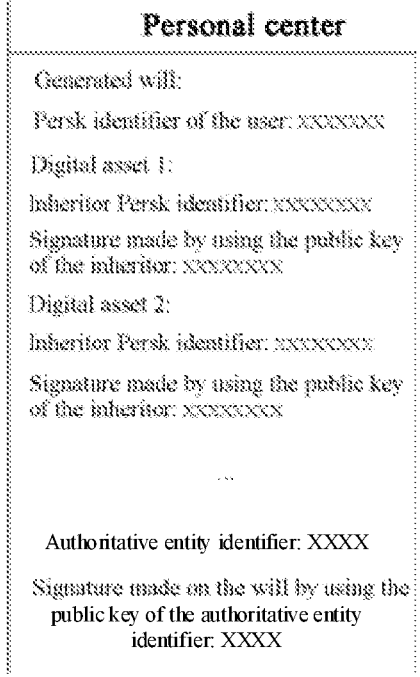

After the public key the inheritor is obtained, the digital asset certificate corresponding to the inheritor is signed with the public key of the inheritor. A user Persk identifier, an inheritor Persk identifier, and the signature made on the digital asset certificate by using the public key of the inheritor are put into the will. After the authoritative entity public key is obtained, current content of the will is signed with the authoritative entity public key, and the signature is also put into the will. In this case, the content of the will is shown in FIG. 2D, including the user Persk identifiers, the inheritor Persk identifiers, the signatures made on the corresponding digital asset certificates by using the public keys of the inheritors, and the will signature generated by using the authoritative entity (such as a judicial institution) public key. The signatures made on the corresponding digital asset certificates by using the public keys of the inheritors can only be decrypted by using private keys of the inheritors, thereby ensuring the security of the digital asset certificate transfer in inheritance. The will signature generated by using the public key of the authoritative entity can only pass verification by using the private key of the authoritative entity designated by the user, thereby ensuring the credibility of the inheritance process.

Figure 2E:
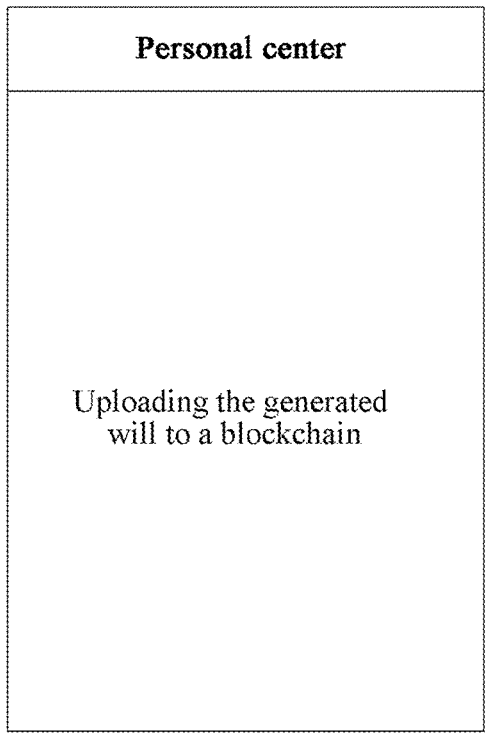

Then, as shown in FIG. 2E, the generated will is recorded on the blockchain.

FIG. 2F to FIG. 2K are no longer interface diagrams of the user terminal, but are interface diagrams of the authoritative entity node 145. Before death, the user signs a smart contract with a blockchain network operator when joining a blockchain network. Each node in FIG. 1A and FIG. 1B is used as a blockchain network node, and can obtain the smart contract. In the smart contract, the user designates an initiator and a certifier of an inheritance program after death.

Figure 2F:
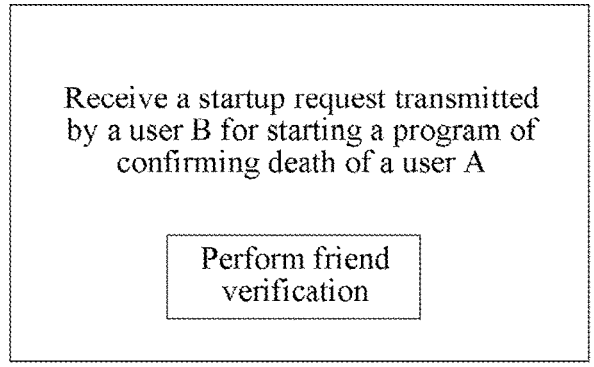
Figure 2G:
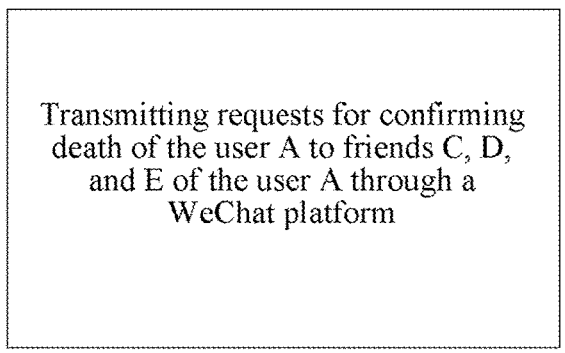

When a startup request that indicates that a user A has died and that is transmitted by a relative B of the user A is received, the interface shown in FIG. 2F is displayed. If B is the initiator of the inheritance program designated in the smart contract of the user, an inheritance verification program is started. That is, as shown in FIG. 2G, requests for confirming that the user A has died are sent to certifiers C, D and E designated in the smart contract, to confirm whether the user A really dies.

Figure 2H:
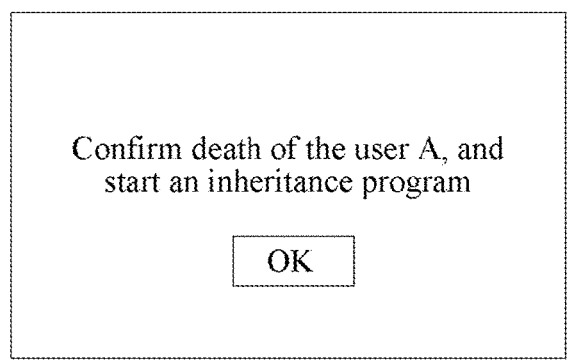

As shown in FIG. 2H, if replies indicating that the user A has died are received from all of the certifiers C, D, and E, it is determined that the user A has died, and the inheritance program is started.

Figure 2I:
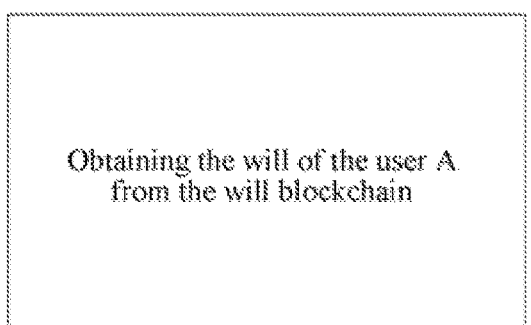
Figure 2J:
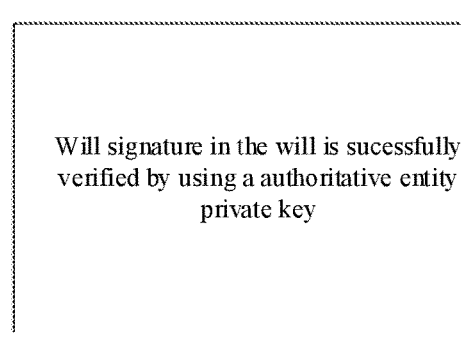

When a worker of the authoritative entity node 145 selects "OK" on the interface in FIG. 2H, the interface shown in FIG. 2I is entered, to find a will with the Persk identifier of the user A from the blockchain. Because the will on the blockchain includes the user Persk identifier, the inheritor Persk identifiers, the signatures made the corresponding digital asset certificates by using the public keys of the inheritors, and the will signature generated by using the authoritative entity public key, the will can be found. Then, as shown in FIG. 2J, the authoritative entity performs signature verification on the will signature generated by using the authoritative entity public key in the will.

Figure 2K:
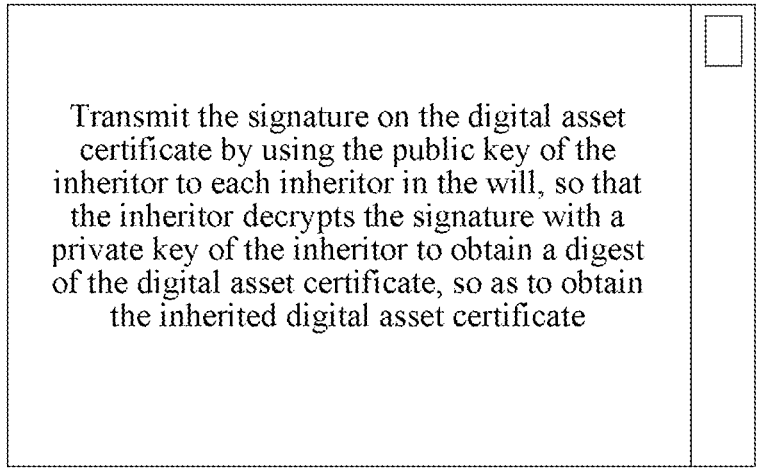

As shown in FIG. 2K, if the signature verification succeeds, the signatures made on the corresponding digital asset certificates by using the public key of the inheritors in the will are retrieved, and are transmitted to Persk corresponding to each inheritor Persk identifier in the will. After an inheritor Persk receives the signature, the signature is decrypted by using the private key of the inheritor, to obtain a digest of the digital asset certificate. The digital asset certificate is obtained by virtue of the digest. If the inheritor Persk is not a true inheritor, there is no private key of the inheritor, and the signature cannot be decrypted by using the private key. That is, the inherited digital asset certificate cannot be obtained.

The above description is made based on the application scenario of the digital asset certificate inheritance after the user dies, and the process in other application scenarios such as user missing is similar.

According to an embodiment of this disclosure, an information processing method in digital asset certificate inheritance transfer is provided. The digital asset certificate is an asset certificate in a digital form, for example, an electronic financing product certificate. The digital asset certificate inheritance transfer refers to transferring a digital asset certificate of a user to a corresponding inheritor after a life cycle of the user ends. The life cycle refers to a period from the birth to death or declaration of missing of the user, and the end of the life cycle includes the death and the declaration of missing.

Figure 3:
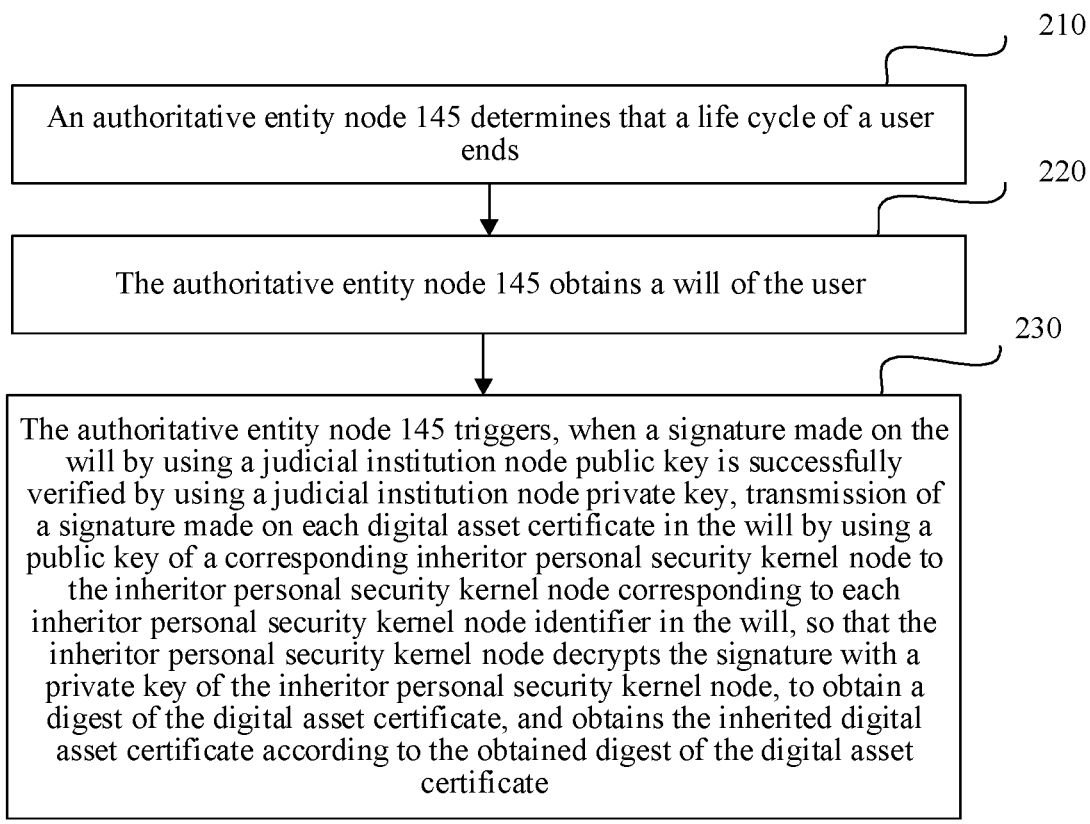
FIG. 3 is a flowchart of an information processing method in digital asset certificate inheritance transfer according to an embodiment of this disclosure.

In addition, the information processing method in digital asset certificate inheritance transfer provided in this disclosure is performed by an authoritative entity node 145, and as shown in FIG. 3, the method includes the following steps:

Step 210. The authoritative entity node 145 determines that a life cycle of a user ends.

Step 220. The authoritative entity node 145 obtains a will of the user, the will including a user personal security kernel node identifier, at least one inheritor personal security kernel node identifier, a signature made on at least one digital asset certificate by using a public key of a corresponding inheritor personal security kernel node, and a signature made on the will by using a public key of the authoritative entity node. It is possible that each digital asset certificate has a signature made by by using a public key of a corresponding inheritor personal security kernel node.

Step 230. The authoritative entity node 145 triggers, in response to that the signature made on the will by using the public key of the authoritative entity node is successfully verified by using a private key of the authoritative entity node, transmission of the signature made on the respective digital asset certificate in the will by using the public key of the corresponding inheritor personal security kernel node to the inheritor personal security kernel node corresponding to the each inheritor personal security kernel node identifier in the will, so that the inheritor personal security kernel node decrypts the signature with a private key of the inheritor personal security kernel node, to obtain a digest of the digital asset certificate, and obtains the inherited digital asset certificate according to the obtained digest of the digital asset certificate. If there are multiple digital asset certificates, it is possible that each signature made on the each digital asset certificate in the will will be transmitted.

The foregoing steps are described below in detail.

In step 210, the authoritative entity node 145 determines that a life cycle of a user ends.

An official initiation manner, or a civil initiation manner, or a joint official and civil confirmation manner may be used for determining that the life cycle of the user ends.

In the official initiation manner, step 210 includes:
determining, by the authoritative entity node 145, that the life cycle of the user ends in response to an end of life cycle notification from an investigation node 146.

The investigation node 146 is a terminal of an institution that is entrusted by the authoritative entity to investigate various cases in the will inheritance. For example, when the authoritative entity is a court, the investigation node 146 is a terminal of the investigation committee established by the court. After someone reports a case of missing or death of a user to the court, the court entrusts an official of the investigation committee to investigate a social relationship of the user and determine whether the user really dies or needs to be declared missing. An end of life cycle notification is generated by the official at the investigation node 146 according to a determination result, and is transmitted to the authoritative entity node 145. The end of life cycle notification is a message announcing that the user has died or is missing.

The advantage of this embodiment is that, the end of life cycle notification is obtained after the relevant official of the investigation node 146 investigates the case, is relatively comprehensive, and has a small error.

In the civil initiation manner, step 210 includes:
receiving, by the authoritative entity node 145, a startup request of a startup node;
transmitting, by the authoritative entity node 145, user end of life cycle confirmation messages to a plurality of certifier nodes through a social interaction system platform;
determining, by the authoritative entity node 145, that the life cycle of the personal security kernel node of the user ends in response to that replies of the plurality of certifier nodes meet a predetermined condition.

The startup node is a terminal that starts the will inheritance program.

In an embodiment, a startup node user is any terminal (including the court terminal). That is, the inheritance process is started provided that a person starts the inheritance program.

In another embodiment, the startup node is a user terminal in a user address book. That is, only a person known by the user can start the inheritance program, thereby avoiding false reports and irrelevant harassment. After the death or missing of the user, it is very likely that the user personal security kernel node client cannot be found, but the user address book may be stored in a personal security kernel node server. Therefore, the user address book may be obtained from the personal security kernel node server.

In another embodiment, the startup node is a startup node designated by the user in the smart contract in the period of life cycle. For example, in the period of life cycle, the user may designate a startup node identifier in the smart contract, for example, a terminal identifier of a friend. The smart contract may correspond to the user personal security kernel node identifier, and is stored in all blockchain nodes, or may be stored in the blockchain. The startup request includes the user personal security kernel node identifier. The authoritative entity node 145 may obtain the user personal security kernel node identifier from the startup request, and finds the smart contract corresponding to the user personal security kernel node identifier locally or from the blockchain, so as to obtain the startup node identifier therein. If the identifier is an identifier a transmitter of the startup request, the inheritance process is started. In this embodiment, the security of starting the inheritance is improved.

In an embodiment, the smart contract is generated by using the following process:
displaying a smart contract template list; and
integrating, in response to selecting a smart contract template by the user from the smart contract template list and filling the selected smart contract template with content, the filled content into the smart contract template, to generate a smart contract for the user.

That is, a plurality of smart contract templates are provided in the system for the user, and some content in the template needs to be filled in by the user. The user may select a smart contract template from the list in a manner of, for example, checking, and fill in the template with content at positions where the content needs to be filled. The content filled in by the user is integrated into the selected smart contract template, to generate a smart contract.

The social interaction system platform, for example, a WeChat platform server or a Facebook platform server, refers to a platform that provides an identity certificate for the user and has a higher data security protection capability and universal service capability than a general application service platform. Because a large quantity of users are registered with the platform, inheritance program startup confirmation request messages may be transmitted to a plurality of certifier nodes through the platform. The inheritance program startup confirmation request is a request to confirm whether the user dies or is missing, so as to determine whether to start the inheritance program.

In an embodiment, the plurality of certifier nodes are randomly selected from the user address book. The user address book described above may be obtained from the personal security kernel node server. The advantage of this embodiment is that, because people in the address book are all known by the user, to randomly select people from the address book can avoid a risk that the user colludes with friends to cheat.

In an embodiment, the plurality of certifier node identifiers are designated by the user in the period of the life cycle of the user, and like the startup node, the plurality of certifier node identifiers are recorded in the smart contract. The smart contract corresponds to the user personal security kernel node identifier, and is stored in each blockchain node, or may be stored in the blockchain. The authoritative entity node 145 obtains the user personal security kernel node identifier from the startup request, finds the corresponding smart contract locally or from the blockchain, finds the plurality of certifier node identifiers from the smart contract, and transmits the user end of life cycle confirmation messages to the plurality of certifier nodes through the social interaction system platform. In this embodiment, the user can select the execution process of the will more flexibly.

The predetermined condition herein is a condition that is preset and that replies of the plurality of certifier nodes need to meet. In an embodiment, the predetermined condition is that the replies of the plurality of certifier nodes are all replies confirming that the life cycle of the user ends. In an embodiment, the predetermined condition is that replies of more than a predetermined proportion of the plurality of certifier nodes are replies confirming that the life cycle of the user ends.

The advantage of the civil initiation manner is that, the initiation is executed automatically by using a machine node, thus achieving a high automation degree, and avoiding time-consuming government approval for investigation.

In the joint official and civil confirmation manner, the determining, by the authoritative entity node 145, that the life cycle of the user ends in response to that replies of a plurality of certifier nodes meet a predetermined condition includes:
determining, by the authoritative entity node 145, that the life cycle of the personal security kernel node of the user ends in response to that the replies of the plurality of certifier nodes meet the predetermined condition, and an end of life cycle notification from an investigation node is received.

That is, the replies of the plurality of certifier nodes need to meet the predetermined condition, and moreover, an official end of life cycle notification is also required. It is determined that the life cycle of the user ends only when the two conditions are both met. In this embodiment, the security of determining that the life cycle of the user ends is improved.

In step 220, the authoritative entity node 145 obtains a will of the user, the will including a user personal security kernel node identifier, each inheritor personal security kernel node identifier, a signature made on each digital asset certificate by using a public key of a corresponding inheritor personal security kernel node, and a signature made on the will by using a public key of the authoritative entity node.

In an embodiment, obtaining, by the authoritative entity node 145, a will of the user includes: obtaining, by the authoritative entity node 145, the will of the user corresponding to the user personal security kernel node identifier. That is, the authoritative entity node 145 may obtain the will of the corresponding user according to the user personal security kernel node identifier.

The user personal security kernel node identifier is a marker for distinguishing the user personal security kernel node from personal security kernel nodes of other persons, and may be represented by a letter, a number, a symbol, and the like, and a combination thereof. The user personal security kernel node identifier is recorded in the will, in order to find the corresponding will according to the identifier (the will including the identifier) after the life cycle of the user ends.

The inheritor personal security kernel node identifier is an identifier of a personal security kernel node of an inheritor designated by the user for the digital asset certificate of the user, and is a marker for distinguishing the inheritor personal security kernel node from personal security kernel nodes of other persons. In the will, for each digital asset certificate, there may be identifiers of different inheritor personal security kernel nodes.

The signature made on the digital asset certificate by using the public key of the corresponding inheritor personal security kernel node refers to a result obtained by encrypting the digest, which is generated according to a predetermined digest algorithm for the each digital asset certificate of the user, with the public key of the corresponding inheritor personal security kernel node. If the digital asset certificate is directly transmitted and intercepted by a third party, the digital asset certificate can be conveniently retrieved by the third party. Because the signature is obtained by first generating the digest and then performing encryption with the public key of the corresponding inheritor personal security kernel node, the signature cannot be decrypted without the public key of the inheritor personal security kernel node, thereby improving the safety of transferring the digital asset certificate in inheritance.

The signature made on the will by using the public key of the authoritative entity node is a signature made on the current content of the will by using the public key of the authoritative entity node, including generating a digest according to the predetermined digest algorithm for the current content of the will, and encrypting the digest with the public key of the authoritative entity node. The signature plays a role of verifying whether an authoritative entity node that executes the will is an authoritative entity node designated by the user. If the authoritative entity node that executes the will is not the authoritative entity node designated by the user, the authoritative entity node does not have the private key of the authoritative entity node, and cannot verify the signature successfully. The credibility of the authoritative entity node in inheritance is ensured, thereby improving the security of the inheritance program.

After being generated, the will may be recorded onto the blockchain, or may be stored in the personal security kernel node server of the user. The reason is that, after the life cycle of the user ends, it is possible that the personal security kernel node client is also missing as the user terminal is missing, and the will is possible to disappear. The will stored on the blockchain or the personal security kernel node server can be found after the life cycle of the user ends.

In this embodiment of storing the will on the blockchain, step 220 includes: obtaining, by the authoritative entity node 145 from the blockchain, a will including the user personal security kernel node identifier as the will of the user corresponding to the user personal security kernel node identifier, where the will is recorded on the blockchain after being generated.

As described above, the will includes the user personal security kernel node identifier, the each inheritor personal security kernel node identifier, the signature made on the each digital asset certificate by using the public key of the corresponding inheritor personal security kernel node, and the signature made on the will by using the public key of the authoritative entity node. Because the startup request includes the user personal security kernel node identifier, the authoritative entity node may search the blockchain for the will including the identifier. The will is the will of the user corresponding to the user personal security kernel node identifier.

In an embodiment, the will further includes header information. The header information includes a will feature character and a will length. The step of obtaining, from the blockchain, a will including the user personal security kernel node identifier includes:

recognizing, according to the will length in the header information, a data block associated with the will, after the header information with the will feature character is recognized in the blockchain; and determining whether the recognized data block includes the user personal security kernel node identifier. If the recognized data block includes the user personal security kernel node identifier, the recognized data block constitutes the will including the user personal security kernel node identifier.

The header information is block header information of each data block after the will is recorded on the blockchain as a data block. Each data block further includes a block body in which content in the will is recorded. The will may include a plurality of data blocks. As described above, the will includes the user personal security kernel node identifier, the each inheritor personal security kernel node identifier, the signature made on the each digital asset certificate by using the public key of the corresponding inheritor personal security kernel node, and the signature made on the will by using the public key of the authoritative entity node. Different inheritor personal security kernel node identifiers and the corresponding signatures made on different digital asset certificates by using the public keys of the corresponding inheritor personal security kernel nodes may be recorded in different data blocks.

The will feature character is a sign representing that the data block on the blockchain is the data block associated with the will. Without the will feature character, it represents that the will is not recorded in the data block. With the will feature character, it represents that the will is recorded in the data block. Because various data blocks are recorded on the blockchain, some data blocks are totally irrelevant to the will. To reduce a search range, the will feature character is provided in the block header of the data block in which the will is stored. If the will feature character is found from the blockchain, it is considered that the data block including the will feature character is the data block of the will.

The will length is a sign representing a quantity of consecutive data blocks occupied by the will on the blockchain. For example, if the will length is 7, it represents that seven data blocks starting from the current data block on the blockchain are all data blocks associated with the will.

Therefore, the data blocks associated with the will can be recognized according to the will length in the header information after the header information with the will feature character is recognized in the blockchain, and it is then determined whether the user personal security kernel node identifier exists in the range of the data blocks. The advantage of this is that, compared with searching the whole blockchain for the data block including the user personal security kernel node identifier, the searching range is greatly reduced, and the searching efficiency is improved.

If it is determined that the user personal security kernel node identifier exists in the range of the consecutive data blocks, the range of the consecutive data blocks (the quantity of consecutive data blocks indicated by the will length) constitutes the will including the user personal security kernel node identifier.

In this embodiment in which the will is stored in a personal security kernel node server, the personal security kernel node includes a personal security kernel node client and a personal security kernel node server. Step 220 includes: obtaining, by the authoritative entity node 145 from a personal security kernel node server corresponding to the user personal security kernel node identifier, a will as the will of the user corresponding to the user personal security kernel node identifier, where the will is stored in the personal security kernel node server after being generated by the personal security kernel node client.

After being generated by the personal security kernel node client, the will is stored in the personal security kernel node server. The personal security kernel node client and the personal security kernel node server have the same personal security kernel node identifier. The startup request includes the user personal security kernel node identifier. In this way, the personal security kernel node server corresponding to the identifier may be found, and the will is obtained from the personal security kernel node server.

In step 230, the authoritative entity node 145 triggers, in response to that the signature made on the will by using the public key of the authoritative entity node is successfully verified by using a private key of the authoritative entity node, transmission of the signature made on the each digital asset certificate in the will by using the public key of the corresponding inheritor personal security kernel node to the inheritor personal security kernel node corresponding to the each inheritor personal security kernel node identifier in the will, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

After the authoritative entity node 145 obtains the will, the authoritative entity node 145 does not immediately start the inheritance process. The reason is that, if the authoritative entity node is not the authoritative entity node designated by the user, the authoritative entity node has no right to execute subsequent inheritance program. Therefore, the authoritative entity node 145 first performs, by using the private key of the authoritative entity node, signature verification on the signature made on the will by using the public key of the authoritative entity node.

In an embodiment, the will further includes an authoritative entity node identifier designated for execution of the will. As shown in FIG. 2B, the authoritative entity node identifier is designated by the user on the interface for execution of the will, so that the will in FIG. 2D includes the identifier.

Figure 4:
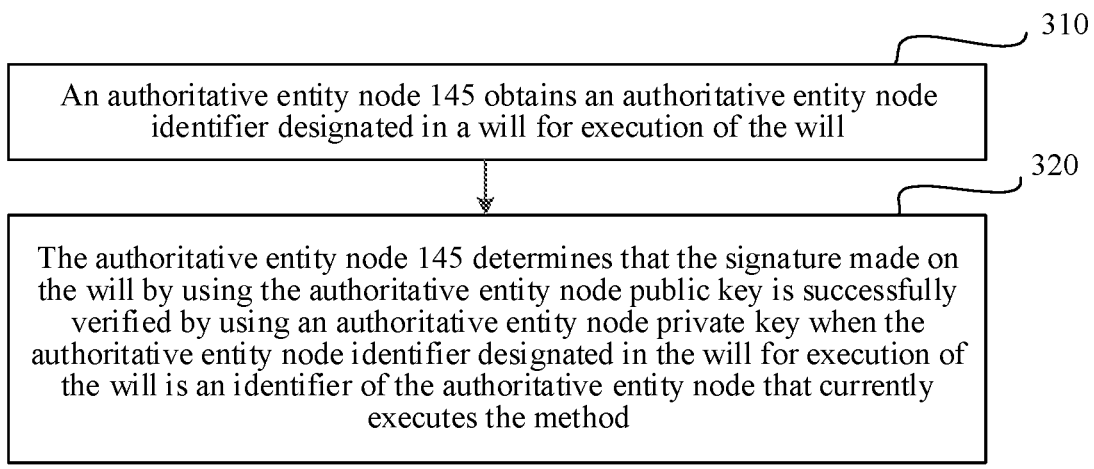
FIG. 4 is a flowchart of verifying a signature in a will made on the will by using a public key of the authoritative entity node according to an embodiment of this disclosure.

In this embodiment, as shown in FIG. 4, that the signature made on the will by using the public key of the authoritative entity node is successfully verified by the authoritative entity node 145 by using the private key of the authoritative entity node includes the following steps:

Step 310. The authoritative entity node 145 obtains the authoritative entity node identifier designated in the will for execution of the will.

Step 320. The authoritative entity node 145 determines that the signature made on the will by using the public key of the authoritative entity node is successfully verified by using the private key of the authoritative entity node, in response to that the authoritative entity node identifier designated in the will for execution of the will is an identifier of the authoritative entity node that currently executes the method.

Because the will includes the authoritative entity node identifier designated for execution of the will, the identifier may be obtained from the will. Because the authoritative entity node 145 locally stores the identifier of the authoritative entity node, the authoritative entity node 145 compares the obtained identifier with the locally stored identifier of the authoritative entity node. If the obtained identifier is consistent with the locally stored identifier of the authoritative entity node, the signature made on the will by using the public key of the authoritative entity node in the will is verified by using the private key of the authoritative entity node.

The advantage of this embodiment is that, permission verification of the authoritative entity node is performed by combining a comparison of authoritative entity node identifiers with the verification on the signature generated by using the public key of the authoritative entity node. Compared with method using signature verification only, the accuracy of the permission verification of the authoritative entity node can be further improved.

In an embodiment, step 320 includes:
decrypting, by the authoritative entity node 145 by using the private key of the authoritative entity node, the signature made on the will by using the public key of the authoritative entity node, to obtain a will digest generated after the decryption, in response to that the authoritative entity node identifier designated in the will for execution of the will is the identifier of the authoritative entity node that currently executes the method;

generating, by the authoritative entity node 145, a second will digest; and determining, by the authoritative entity node 145 in response to that the will digest generated after the decryption is consistent with the generated second will digest, that the signature made on the will by using the public key of the authoritative entity node is successfully verified by using the private key of the authoritative entity node.

Because the process of generating a will signature includes generating a digest according to a predetermined digest algorithm (for example, a hash algorithm) for the will content, and encrypting the digest with the public key of the authoritative entity node, the signature verification follows a reverse process. First, the signature is decrypted with the private key of the authoritative entity node, to obtain the second will digest content. Then, the second will digest is then generated according to the same digest algorithm used when the signature is generated. When the will signature is generated, no signature is put into the will, and the will signature is generated based on content except the will signature in the will. Therefore, in an embodiment, the generating a second will digest includes:

removing, from the will, the signature made on the will by using the public key of the authoritative entity node; and generating the second will digest by applying, to the will from which the signature has been removed, the same predetermined digest algorithm used when the will is generated.

That is, it follows the same process of generating a digest when the signature of the will is generated. The signature made on the will by using the public key of the authoritative entity node in the will is first removed, because when a signature of the will is generated, a digest of content of the will that does not include the signature, rather than the will that includes the signature, is generated and encrypted. In addition, the predetermined digest algorithm same as that in the personal security kernel node of the user is further stored in the authoritative entity node 145. In this way, the digest generated by applying the predetermined digest algorithm to the will from which the signature has been removed and the digest obtained when the will signature is generated have a consistent basis for comparison.

After the predetermined digest algorithm is applied to the will from which the signature has been removed, the will digest generated after decryption is compared with the generated second will digest. If the will digest generated after decryption is consistent with the generated second will digest, the signature verification succeeds, and it is considered that the authoritative entity node that currently executes the will is the authoritative entity node designated by the user. In this case, transmission of the signature made on the each digital asset certificate in the will by using the public key of the corresponding inheritor personal security kernel node to the inheritor personal security kernel node corresponding to the each inheritor personal security kernel node identifier in the will can be triggered.

The trigger means that the transmission may be performed by the authoritative entity node 145 or by another node designated, or the smart contract in the blockchain network may be initiated, and the transmission may be performed by a node automatically allocated in the smart contract.

In the foregoing process, the signature of the each digital asset certificate is transmitted instead of the digital asset certificate, because even if the digital asset certificate is intercepted by a third party, the signature cannot be decrypted without the private key of the inheritor personal security kernel node, and therefore, the third party cannot obtain the inherited digital asset certificate, thereby improving the security of the digital asset certificate in inheritance.

Because signing the digital asset certificate with the public key of the inheritor personal security kernel node includes the process of generating a digest according to a predetermined digest algorithm for the digital asset certificate and encrypting the digest with the public key of the inheritor personal security kernel node. The process of decrypting the signature is also divided into two steps. First, the inheritor personal security kernel node decrypts the signature with the private key of the inheritor personal security kernel node, to obtain the digest of the digital asset certificate. Then, the inherited digital asset certificate is obtained according to the obtained digest of the digital asset certificate.

There are a plurality of implementations of obtaining the inherited digital asset certificate according to the obtained digest of the digital asset certificate.

In an embodiment, the obtaining the inherited digital asset certificate according to the obtained digest of the digital asset certificate includes: obtaining a digital asset certificate corresponding to the obtained digest of the digital asset certificate from the blockchain, where the digital asset certificate, after being generated, is correspondingly stored on the blockchain with the digest of the digital asset certificate.

This embodiment follows a mode of on-chaining the digital asset certificate immediately after the digital asset certificate is generated. After the user personal security kernel node and the service relied party node (for example, a financial management company terminal) perform a service (for example, sign a financing product purchase contract), a digital asset certificate (for example, a financing product certificate) is generated between the user personal security kernel node and the service relied party node. After the digital asset certificate is generated, a digest of the digital asset certificate is immediately generated according to the predetermined digest algorithm, and the digest and the digital asset certificate are correspondingly stored on the blockchain. In this way, the digital asset certificate corresponding to the obtained digest of the digital asset certificate may be directly queried from the blockchain.

In an embodiment, the personal security kernel node includes a personal security kernel node client and a personal security kernel node server. The obtaining the inherited digital asset certificate according to the obtained digest of the digital asset certificate includes: obtaining the digital asset certificate corresponding to the obtained digest of the digital asset certificate from the personal security kernel node server, where the digital asset certificate, after being generated by the personal security kernel node client, is correspondingly stored on the personal security kernel node server with the digest of the digital asset certificate.

In this embodiment, after the personal security kernel node client and the service relied party node generate the digital asset certificate, the digest of the digital asset certificate is generated according to the predetermined digest algorithm, and the digest and the digital asset certificate are correspondingly stored on the personal security kernel node server. In this way, the digital asset certificate corresponding to the obtained digest of the digital asset certificate may be directly queried from the personal security kernel node server.

In an embodiment, the will further includes a service relied party node identifier of the each digital asset certificate. The triggering transmission of the signature made on the each digital asset certificate in the will by using the public key of the corresponding inheritor personal security kernel node to the inheritor personal security kernel node corresponding to the each inheritor personal security kernel node identifier in the will includes: triggering transmission of the signature made on the each digital asset certificate in the will by using the public key of the corresponding inheritor personal security kernel node and the service relied party node identifier of the each digital asset certificate to the inheritor personal security kernel node corresponding to the each inheritor personal security kernel node identifier in the will.

In this case, the obtaining the inherited digital asset certificate according to the obtained digest of the digital asset certificate includes:

transmitting the obtained digest of the digital asset certificate to a service relied party node corresponding to the service relied party node identifier of the digital asset certificate; and receiving the digital asset certificate corresponding to the digest of the digital asset certificate from the service relied party node.

Each digital asset certificate is formed after the user personal security kernel node performs a service with one service relied party node. After the digital asset certificate is generated, the digital asset certificate and the digest of the digital asset certificate are backed up in the service relied party node. Therefore, the corresponding digital asset certificate may be retrieved from the service relied party node by virtue of the digest of the digital asset certificate. To request the digital asset certificate from the service relied party node, the will needs to include the identifier of the service relied party node, where the identifier may be generated according to the service relied party node identifier (the service relied party node identifier is an important field of the digital asset certificate, and the digital asset certificate cannot be checked without the field) included in the digital asset certificate when the will is generated. When the signature made on the digital asset certificate by using the public key of the corresponding inheritor personal security kernel node is transmitted to the inheritor personal security kernel node, the service relied party node identifier is transmitted simultaneously. In this way, the inheritor personal security kernel node may transmit the obtained digest of the digital asset certificate to the service relied party node corresponding to the service relied party node identifier of the digital asset certificate. In the service relied party node, the digital asset certificate is correspondingly stored with the digest of the digital asset certificate, so that the digital asset certificate corresponding to the digest of the digital asset certificate may be received from the service relied party node.

In an embodiment, the inherited digital asset certificate includes a service relied party node identifier on which the digital asset certificate relies, so that the inheritor personal security kernel node generates, with a service relied party node corresponding to the service relied party node identifier, an updated digital asset certificate between the inheritor node and the service relied party node according to the inherited digital asset certificate.

That is, although the inheritor personal security kernel node obtains the inherited digital asset certificate in step 230, the digital asset certificate is formed by the user personal security kernel node and the relied party node, but is not formed by the inheritor personal security kernel node and the relied party node. Therefore, the inheritor personal security kernel node needs to form an updated digital asset certificate with the relied party node.

In an embodiment, the generating, with a service relied party node corresponding to the service relied party node identifier, an updated digital asset certificate between the inheritor node and the service relied party node according to the inherited digital asset certificate includes the following process performed by the inheritor personal security kernel node:
- transmitting, by the inheritor personal security kernel node, the inherited digital asset certificate and the inheritor personal security kernel node identifier to the service relied party node corresponding to the service relied party node identifier, so that the service relied party node generates the updated digital asset certificate according to the inherited digital asset certificate and the inheritor personal security kernel node identifier; and
- receiving, by the inheritor personal security kernel node, the updated digital asset certificate transmitted by the service relied party node.

Obligations of the relied party node in the updated digital asset certificate and obligations of the relied party node in the inherited digital asset certificate are exactly the same, except that involved parties have changed from the user personal security kernel node and the service relied party node to the inheritor personal security kernel node and the service relied party node. Therefore, only party information in the content of the inherited digital asset certificate may be changed from the user personal security kernel node identifier and the service relied party node identifier to the inheritor personal security kernel node identifier and the service relied party node identifier, so as to obtain the updated digital asset certificate, and the updated digital asset certificate is transmitted to the inheritor personal security kernel node.

The advantage of this embodiment is that, the inherited digital asset certificates are converted through the convenient program, thereby improving the efficiency of updating the digital asset certificates.

In addition, through the foregoing process, the whole inheritance process is completed, and the personal security kernel node of the user may be set to an end state. The end state of the personal security kernel node of the user may be automatically set by a node allocated in the smart contract. Alternatively, the personal security kernel node of the user may not be set to the end state immediately after the foregoing process is completed. In addition to being used in inheritance, the personal security kernel node of the user may also be used in some other programs. Therefore, the personal security kernel node of the user is set to the end state after other related programs than the inheritance program are completed.

The personal security kernel node of the user has several states, namely, a disabled state, an enabled state, a suspension state, and the end state. Before the user is born, the personal security kernel node of the user is correspondingly in the disabled state. After the user is born, the personal security kernel node is in the enabled state through parent application. In this process, if an event such as report of the loss occurs, the personal security kernel node may need to be set to the suspension state. In the suspension state, the personal security kernel node cannot be operated until the setting is restored. After the life cycle of the user ends, and the foregoing process and other processes of the personal security kernel node of the user that may be used are completed, the personal security kernel node may be set to the end state. In the end state, the personal security kernel node is abolished, and the personal security kernel node cannot be accessed permanently.

In addition, sometimes it is not enough to designate only the inheritor in the will. The effect of the inheritance may vary greatly with different applicable laws of the inheritance. For example, laws of some countries require inheritance taxes, while laws of other countries do not require inheritance taxes. In an embodiment, on the interface in FIG. 2B, the user designates not only the inheritor personal security kernel node identifier corresponding to the each digital asset certificate and the authoritative entity node identifier for execution of the will inheritance, but also designates applicable inheritance laws of the will. In this way, the will shown in FIG. 2D may further include the applicable inheritance laws of the will.

In this embodiment, in step 230, the triggering transmission of the signature made on the each digital asset certificate in the will by using the public key of the corresponding inheritor personal security kernel node to the inheritor personal security kernel node corresponding to the each inheritor personal security kernel node identifier in the will includes:
- triggering transmission of the signature made on the each digital asset certificate by using the public key of the corresponding inheritor personal security kernel node in the will and the applicable inheritance laws of the will to the inheritor personal security kernel node corresponding to the each inheritor personal security kernel node identifier in the will, so that after obtaining the inherited digital asset certificate, the inheritor personal security kernel node performs a process corresponding to the applicable inheritance laws.

That is, because the will further includes the applicable inheritance laws, transmission of not only the signature made on the each digital asset certificate in the will by using the public key of the corresponding inheritor personal security kernel node but also the applicable inheritance laws of the will to the inheritor personal security kernel node corresponding to the inheritor personal security kernel node identifier corresponding to the digital asset certificate in the will is triggered.

The inheritance process corresponding to each inheritance applicable law may be compiled with program code in advance, and the program code is stored on a public server or each user personal security kernel node. In this way, in an embodiment, the performing a process corresponding to the applicable inheritance laws includes the following process performed by the inheritor personal security kernel node: obtaining, from the public server or the inheritor personal security kernel node, program code corresponding to the applicable inheritance laws according to the received applicable inheritance laws, and inputting the inherited digital asset certificate into the program code, so as to perform the process corresponding to the applicable inheritance laws.

The advantage of this embodiment is that, the inheritance may be performed according to the applicable inheritance laws designated by the user, thereby improving the inheritance fineness.

In addition, not all users make wills before the life cycle ends. When the user does not make a will before the life cycle ends, it is equivalent to a case of legal inheritance. In addition to the case of the will inheritance, in an embodiment, data processing of the legal inheritance is further automated, thereby implementing automated inheritance void of a will.

Figure 5:
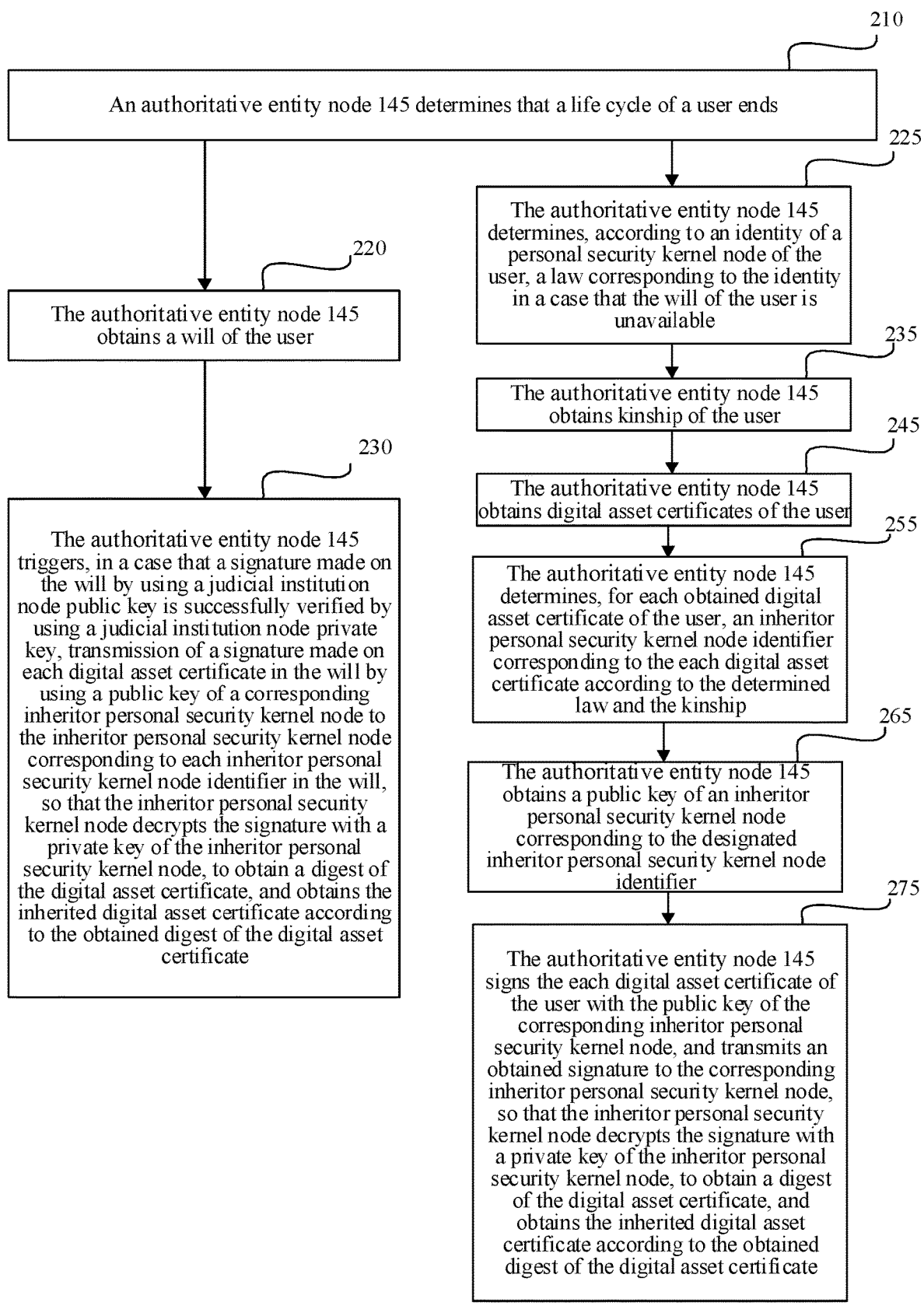
FIG. 5 is a flowchart of an information processing method in digital asset certificate inheritance transfer according to an embodiment of this disclosure.

As shown in FIG. 5, in an embodiment, after step 210, the method further includes the following steps:

Step 225. The authoritative entity node 145 determines, according to an identity of a personal security kernel node of the user, a law corresponding to the identity in response to that the will of the user is unavailable.

Step 235. The authoritative entity node 145 obtains kinship of the user.

Step 245. The authoritative entity node 145 obtains digital asset certificates of the user.

Step 255. The authoritative entity node 145 determines, for each obtained digital asset certificate of the user, an inheritor personal security kernel node identifier corresponding to the each digital asset certificate according to the determined law and the kinship.

Step 265. The authoritative entity node 145 obtains a public key of an inheritor personal security kernel node corresponding to the determined inheritor personal security kernel node identifier.

Step 275. The authoritative entity node 145 signs the each digital asset certificate of the user with the public key of the corresponding inheritor personal security kernel node, and transmits an obtained signature to the corresponding inheritor personal security kernel node, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

The steps are described below in detail.

In step 225, the authoritative entity node 145 determines, according to an identity of a personal security kernel node of the user, a law corresponding to the identity in response to that the will of the user is unavailable.

If the will of the user is unavailable from either the blockchain or the user personal security kernel node server, it is possible that the user has no time to make a will before the life cycle ends. In this case, the legal inheritance needs to be started, and the law corresponding to the identity is determined according to the identity of the personal security kernel node of the user.

After the life cycle of the user ends, it is possible that the personal security kernel node client of the user cannot be found. Therefore, in an embodiment, the identity of the personal security kernel node of the user is stored in the personal security kernel node server in advance. The determining, according to an identity of a personal security kernel node of the user, a law corresponding to the identity includes:

transmitting an identity request to a personal security kernel node server corresponding to a user personal security kernel node identifier in a startup request;

receiving the identity of the personal security kernel node of the user from the personal security kernel node server; and searching a correspondence table between identities and the laws, to determine the law corresponding to the identity.

Because the startup request includes the user personal security kernel node identifier, which corresponds to a unique group of a personal security kernel node client and a personal security kernel node server, the identity request may be transmitted to the personal security kernel node server corresponding to the user personal security kernel node identifier in the startup request.

The identity of the personal security kernel node of the user refers to nationality, a registration area, or the like of the user. For example, the user is a Chinese person, Chinese laws may be applicable to inheritance. If the user is an American person, American laws may be applicable to inheritance.

The correspondence table between identities of personal security kernel nodes of users and applicable inheritance laws, that is, the correspondence table between identities and laws, is stored in a predetermined server or each personal security kernel node. The law corresponding to the identity may be determined from the correspondence table according to the identity of the personal security kernel node of the user.

In step 235, the authoritative entity node 145 obtains kinship of the user.

In an embodiment, a kinship list of the user is stored in the user personal security kernel node server. Therefore, the kinship of the user may be obtained from the kinship list of the user in the user personal security kernel node server.

In step 245, the authoritative entity node 145 obtains digital asset certificates of the user.

In an embodiment, the digital asset certificates of the user are stored not only in the user personal security kernel node client but also in the user personal security kernel node server. Although the user personal security kernel node client may be missing as the life cycle of the user ends, the corresponding user personal security kernel node server may be found according to the user personal security kernel node in the startup request, and the digital asset certificates of the user may be obtained from the user personal security kernel node server.

In step 255, the authoritative entity node 145 determines, for each obtained digital asset certificate of the user, an inheritor personal security kernel node identifier corresponding to the each digital asset certificate according to the determined law and the kinship.

In an embodiment, program code corresponding to each applicable law is provided in a dedicated server or each personal security kernel node. Each digital asset certificate of the user and the kinship are inputted into the program code corresponding to the determined law, to obtain the inheritor personal security kernel node identifier corresponding to the each digital asset certificate according to the law.

In step 265, the authoritative entity node 145 obtains a public key of an inheritor personal security kernel node corresponding to the determined inheritor personal security kernel node identifier.

In an embodiment, the public key of the inheritor personal security kernel node corresponding to the inheritor personal security kernel node identifier may be obtained by requesting from a dedicated certification authority (CA) server in the blockchain. Because the CA server is a node that issues public and private keys of blockchain nodes, the public key of any blockchain node may be requested from the CA server.

In another embodiment, the obtaining a public key of an inheritor personal security kernel node corresponding to the determined inheritor personal security kernel node identifier includes: obtaining, from a blockchain, the public key of the inheritor personal security kernel node corresponding to the determined inheritor personal security kernel node identifier, where the public key of the inheritor personal security kernel node is generated by the inheritor personal security kernel node and is correspondingly recorded on the blockchain with a public key identifier of the inheritor personal security kernel node.

In this embodiment, the public key is not generated and stored by the CA server, but is generated and distributed on the blockchain by each personal security kernel node. Because the public key is correspondingly recorded on the blockchain with the personal security kernel node identifier, the public key may be found from the blockchain by using the personal security kernel node identifier.

In another embodiment, the obtaining a public key of an inheritor personal security kernel node corresponding to the determined inheritor personal security kernel node identifier includes:

transmitting a public key obtaining request to an inheritor friend personal security kernel node through a social interaction system platform, the public key obtaining request including the determined inheritor personal security kernel node identifier; and receiving, from the inheritor friend personal security kernel node, the public key of the inheritor personal security kernel node corresponding to the inheritor personal security kernel node identifier.

On the social interaction system platform (for example, WeChat), when two users add each other as a friend, a public key of one user is transmitted to a personal security kernel node of the other user for storage. The social interaction system platform stores friend relationships between all users who add each other as friends. In this case, through the social interaction system platform, a list of all inheritor personal security kernel node identifiers having friend relationships with the inheritor personal security kernel node identifier may be obtained, and the public key obtaining request is transmitted to a personal security kernel node corresponding to any personal security kernel node identifier in the list. The public key obtaining request includes the determined inheritor personal security kernel node identifier. The personal security kernel node returns the public key of the inheritor personal security kernel node corresponding to the inheritor personal security kernel node identifier.

In step 275, the authoritative entity node 145 signs each digital asset certificate of the user with the public key of the corresponding inheritor personal security kernel node, and transmits an obtained signature to the corresponding inheritor personal security kernel node, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

The difference between this step and step 230 only lies in that, in step 230, the signature made by using the public key of the corresponding inheritor personal security kernel node is transmitted according to the inheritor personal security kernel node corresponding to the digital asset certificate in the will, and in step 275, the signature made by using the public key of the corresponding inheritor personal security kernel node is transmitted according to the inheritor personal security kernel node corresponding to the digital asset certificate derived through the law. The general process is the same. Therefore, details are not described again.

The advantage of this embodiment is that, automatic legal inheritance is implemented, and the security in inheritance is ensured.

Figure 6:
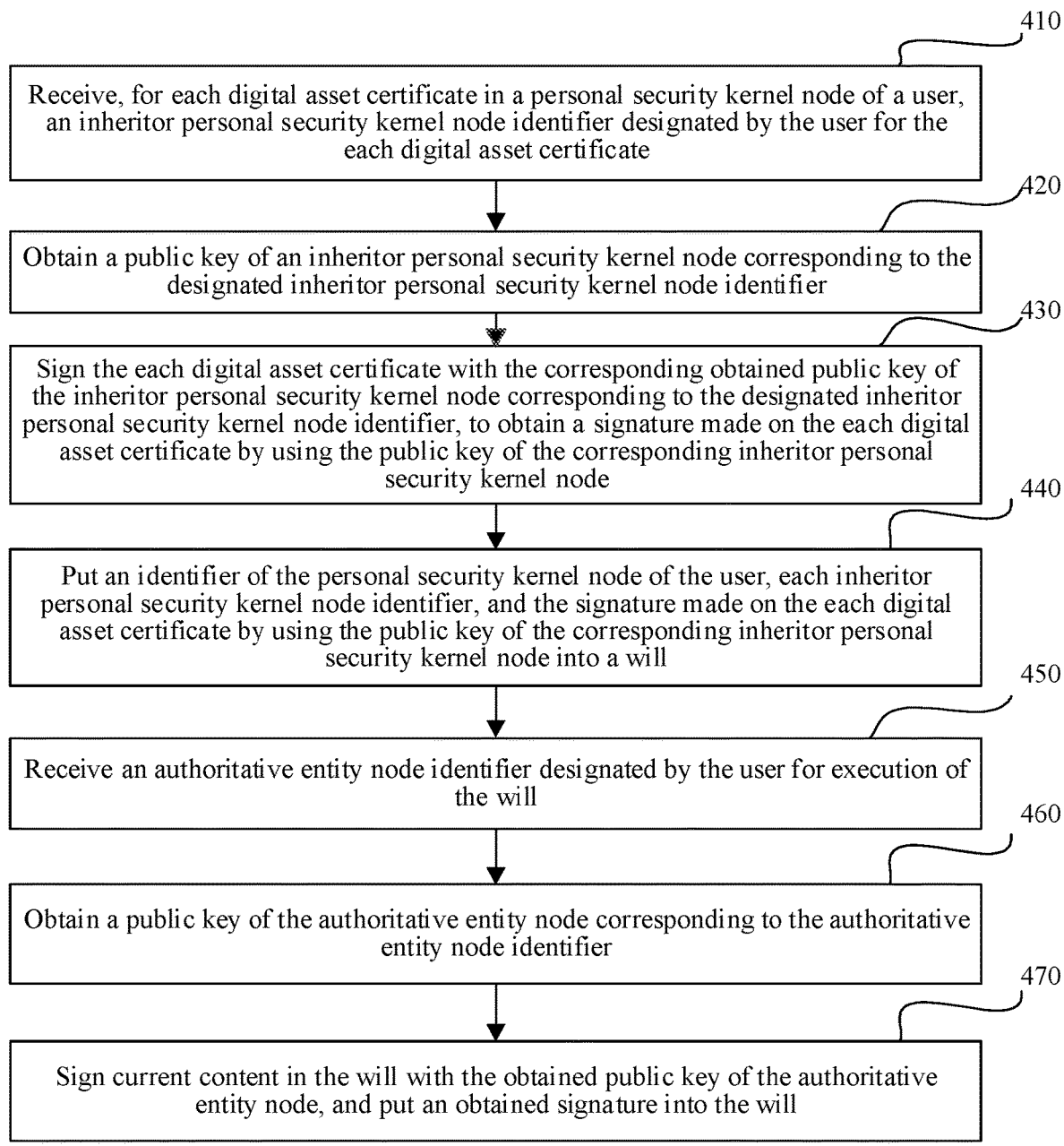
FIG. 6 is a flowchart of a process of generating a will according to an embodiment of this disclosure.

As shown in FIG. 6, in an embodiment, the will is generated by the personal security kernel node of the user by using the following process:

Step 410. Receive, for each digital asset certificate in the personal security kernel node of the user, an inheritor personal security kernel node identifier designated by the user for the each digital asset certificate.

Step 420. Obtain a public key of an inheritor personal security kernel node corresponding to the designated inheritor personal security kernel node identifier.

Step 430. Sign the each digital asset certificate with the corresponding obtained public key of the inheritor personal security kernel node corresponding to the designated inheritor personal security kernel node identifier, to obtain a signature made on the each digital asset certificate by using the public key of the corresponding inheritor personal security kernel node.

Step 440. Put the identifier of the personal security kernel node of the user, each inheritor personal security kernel node identifier, and the signature made on the each digital asset certificate by using the public key of the corresponding inheritor personal security kernel node into the will.

Step 450. Receive an authoritative entity node identifier designated by the user for execution of the will.

Step 460. Obtain a public key of an authoritative entity node corresponding to the authoritative entity node identifier.

Step 470. Sign current content in the will with the obtained public key of the authoritative entity node, and put an obtained signature into the will.

The foregoing process is described below in detail.

In step 410, for each digital asset certificate in the personal security kernel node of the user, an inheritor personal security kernel node identifier designated by the user for the each digital asset certificate is received.

FIG. 2B shows an interface in which inheritor personal security kernel node identifiers are designated by a user for digital asset certificates in a personal security kernel node. Actually, step 410 may be performed through class-based designation or item-based designation. FIG. 2B is an interface of an example of item-based designation.

In this embodiment of the item-based designation, step 410 includes:

displaying a list of digital asset certificates in the personal security kernel node of the user; and receiving, for each digital asset certificate in the list of digital asset certificates, an inheritor personal security kernel node identifier designated by the user for the each digital asset certificate.

In this embodiment, on the interface in FIG. 2B, a list of digital asset certificates including all digital asset certificates in the personal security kernel node of the user is displayed to the user. Below the each digital asset certificate in the list, a drop-down box for designating the inheritor personal security kernel node identifier of the digital asset certificate is displayed. When an arrow on the right of the drop-down box is clicked, a pull-down menu pops up, and all candidate inheritor personal security kernel node identifiers are displayed. All the candidate inheritor personal security kernel node identifiers may be directly exported from the user address book stored in the personal security kernel node of the user, or may be directly exported from a kinship list stored in the personal security kernel node of the user. After the user selects a candidate personal security kernel node identifier from the pull-down menu, it is considered that the inheritor personal security kernel node identifier is designated for the digital asset certificate.

The advantage of this embodiment is that, the user can conveniently designate the corresponding inheritor personal security kernel node identifier for the each digital asset certificate separately, thereby improving the fineness of generating the will.

In this embodiment of the class-based designation, step 410 includes:
- displaying a list of digital asset certificate types in the personal security kernel node of the user; and
- receiving, for each digital asset certificate type in the list of digital asset certificates, the inheritor personal security kernel node identifier designated by the user for the each digital asset certificate type, the designated inheritor personal security kernel node identifier being applied to each digital asset certificate of the each digital asset certificate type.

The difference between the interface in this embodiment and the interface in FIG. 2B lies in that, all the digital asset certificates are displayed in the interface in FIG. 2B, and the list of all the digital asset certificate types (for example, financing product certificate, insurance product certificate, and stock exchange certificate) is displayed in the interface in this embodiment, because the user generally wants to designate the same inheritor to inherit digital asset certificates of the same type (financing product certificates). Then, for each digital asset certificate type in the list of digital asset certificates, the inheritor personal security kernel node identifier is designated by the user for the digital asset certificate type. After the designation, all digital asset certificates of this type are inherited by the designated inheritor personal security kernel node.

The advantage of this embodiment is that, for the feature that the user generally wants to designate the same inheritor to inherit the digital asset certificates of the same type (financing product certificates), the efficiency of generating the will is improved.

In step 420, a public key of an inheritor personal security kernel node corresponding to the designated inheritor personal security kernel node identifier is obtained.

As described above, the public key of the inheritor personal security kernel node corresponding to the designated inheritor personal security kernel node identifier may be obtained by requesting from a dedicated certification authority (CA) server, or may be obtained from the blockchain, or may be obtained from the inheritor friend personal security kernel node through the social interaction system platform. Because the implementations are already described above, details are not described herein again for brevity.

In step 430, each digital asset certificate is signed with the corresponding obtained public key of the inheritor personal security kernel node corresponding to the designated inheritor personal security kernel node identifier, to obtain a signature made on the each digital asset certificate by using the public key of the corresponding inheritor personal security kernel node.

As described above, the process of signing the digital asset certificate with the corresponding obtained public key of the inheritor personal security kernel node corresponding to the designated inheritor personal security kernel node identifier includes the process of generating a digest for the digital asset certificate based on the predetermined digest algorithm and encrypting the digest with the corresponding obtained public key of the inheritor personal security kernel node corresponding to the designated inheritor personal security kernel node identifier.

In step 440, the identifier of the personal security kernel node of the user, each inheritor personal security kernel node identifier, and the signature made on the each digital asset certificate by using the public key of the corresponding inheritor personal security kernel node are put into the will.

The identifier of the personal security kernel node of the user is put into the will because the will needs to be retrieved in the inheritance program by using the identifier of the personal security kernel node of the user. The each inheritor personal security kernel node identifier, and the signature made on the each digital asset certificate by using the public key of the corresponding inheritor personal security kernel node are put into the will because in the inheritance program, the signatures made on the digital asset certificates by using the public keys of the corresponding inheritor personal security kernel nodes need to be transmitted to the inheritor personal security kernel nodes corresponding to the identifiers.

In step 450, an authoritative entity node identifier designated by the user for execution of the will is received.

As shown in FIG. 2B, the user may designate the identifier in the drop-down box for designating the authoritative entity node identifier for execution of the will. When the arrow on the right of the drop-down box is clicked, a pull-down menu pops up, all the candidate authoritative entity node identifiers are displayed. The candidate authoritative entity node identifiers are pre-imported. After the user selects a candidate authoritative entity node identifier from the pull-down menu, it is considered that the authoritative entity node identifier is designated for execution of the will.

In step 460, a public key of an authoritative entity node corresponding to the authoritative entity node identifier is obtained.

Similar to step 420, in this step, the public key of the authoritative entity node may be obtained by requesting from a dedicated certification authority (CA) server, or may be obtained from the blockchain, or may be obtained from the inheritor friend personal security kernel node through the social interaction system platform. Therefore, details are not described again.

In step 470, current content in the will is signed with the obtained public key of the authoritative entity node, and an obtained signature is put into the will.

As described above, the significance of putting the signature into the will is that in the inheritance program, the signature may be used for verifying whether the authoritative entity node that executes the inheritance program is the authoritative entity node that the user really wants. If the authoritative entity node that executes the inheritance program is not the authoritative entity node designated by the user, the private key of the authoritative entity node is unavailable, and the signature cannot be successfully verified.

The advantage of this embodiment is that, the will is generated in a shortcut manner, thereby improving the efficiency of generating the will.

As described above, the will may further include the designated authoritative entity node identifier in addition to the user personal security kernel node identifier, the each inheritor personal security kernel node identifier, the signature made on the each digital asset certificate by using the public key of the corresponding inheritor personal security kernel node, and the signature made on the will by using the public key of the authoritative entity node. In this embodiment, before step 470, the method of generating the will further includes: putting the designated authoritative entity node identifier into the will (not shown).

In step 450, because the authoritative entity node identifier designated by the user for execution of the will is already received, in this step, the identifier may be put into the will.

After being generated, the will may be configured in different positions. As described above, in step 220, the will of the user may be obtained from the blockchain, or may be obtained from the user personal security kernel node server. Actually, the will may be alternatively obtained from the user personal security kernel node client, except that the user personal security kernel node client is very likely to be missing as the life cycle of the user ends. Therefore, it is more reliable to obtain the will from the blockchain or the user personal security kernel node server. In an embodiment, a plurality of security modes may be provided according to security requirements of the will configuration, and each security mode has a different security level.

In an embodiment, after being generated, the will is configured by using the following process:

displaying a security mode list, the security mode list including a first security mode, a second security mode, and a third security mode, where in the first secure mode, the will is stored in a user personal security kernel node client; in the second security mode, the will is stored in a user personal security kernel node client and server; and in the third security mode, the will is stored in a user personal security kernel node server and published on a blockchain;

storing the will in the user personal security kernel node client in response to selecting the first security mode in the security mode list by the user;

storing the will in the user personal security kernel node client and server in response to selecting the second security mode in the security mode list by the user; and storing the will in the user personal security kernel node server, and publishing the will on the blockchain in response to selecting the third security mode in the security mode list by the user.

The configuration of the will refers to the storage and maintenance after the will is generated. The security modes refer to will storage manners corresponding to different security levels. In the first security mode, the will is stored in the user personal security kernel node client. In this case, the digital asset certificates may never be found after a mobile phone of the user is lost, and a security degree is the lowest. In the second security mode, the will is stored in the user personal security kernel node client and server. In this way, the assets may be still found after the mobile phone of the user is lost, and the security degree ranks the second. In the third security mode, the will is stored in the user personal security kernel node client and server, and is published on the blockchain. In this way, the assets can either be found in the user personal security kernel node client or server, or found on the blockchain, and the security degree is the highest.

In addition, after the user generates the will in the period of the life cycle, the user may continue to generate digital asset certificates, for example, form a new digital asset certificate (for example, purchase a new financing product and generate a new financing product certificate) with the relied party node. For the new digital asset certificates, no corresponding inheritor personal security kernel node identifier is designated. Therefore, after the life cycle of the user ends, the new digital asset certificates cannot be inherited according to the will. Therefore, after the user generates the will, in response to that a digital asset certificate is added to the user personal security kernel node, there may be two implementations: the user adds a designated inheritor personal security kernel node identifier of the digital asset certificate, and an inheritor personal security kernel node identifier of the digital asset certificate is automatically designated for the user.

Figure 7:
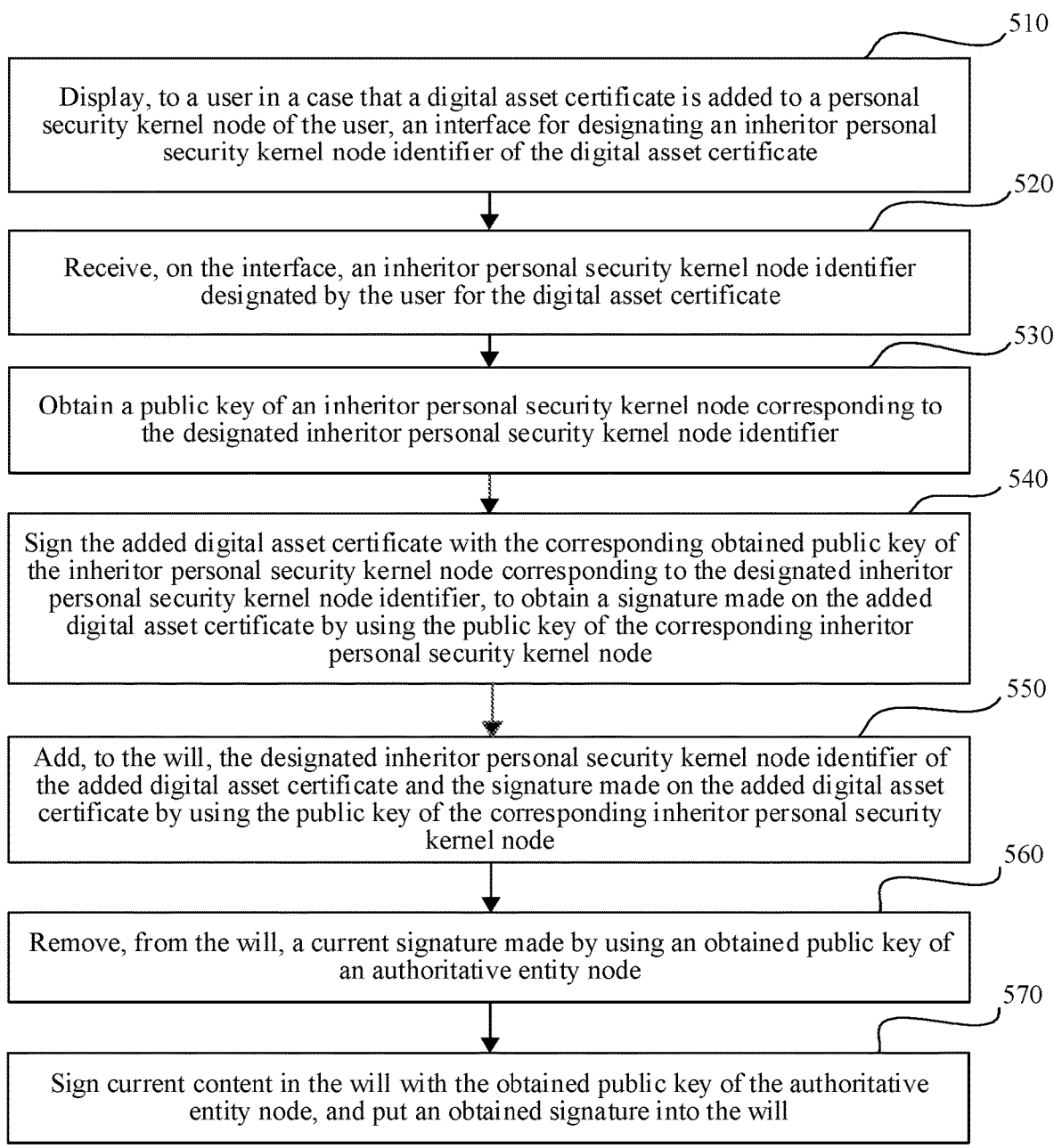
FIG. 7 is a flowchart of a process of updating a will according to an embodiment of this disclosure.

In an embodiment in which the user adds a designated inheritor personal security kernel node identifier of the digital asset certificate, as shown in FIG. 7, the will is updated by the personal security kernel node of the user by using the following process:

Step 510. Display, to the user in response to that a digital asset certificate is added to the personal security kernel node of the user, an interface for designating an inheritor personal security kernel node identifier of the digital asset certificate.

Step 520. Receive, on the interface, an inheritor personal security kernel node identifier designated by the user for the digital asset certificate.

Step 530. Obtain a public key of an inheritor personal security kernel node corresponding to the designated inheritor personal security kernel node identifier.

Step 540. Sign the added digital asset certificate with the corresponding obtained public key of the inheritor personal security kernel node corresponding to the designated inheritor personal security kernel node identifier, to obtain a signature made on the added digital asset certificate by using the public key of the corresponding inheritor personal security kernel node.

Step 550. Add, to the will, the designated inheritor personal security kernel node identifier of the added digital asset certificate and the signature made on the added digital asset certificate by using the public key of the corresponding inheritor personal security kernel node.

Step 560. Remove, from the will, the current signature made by using the obtained public key of the authoritative entity node.

Step 570. Sign current content in the will with the obtained public key of the authoritative entity node, and put an obtained signature into the will.

Step 510 to step 570 are described below in detail.

In step 510, in response to that a digital asset certificate is added to the personal security kernel node of the user, an interface for designating an inheritor personal security kernel node identifier of the digital asset certificate is displayed to the user.

In an embodiment, the personal security kernel node of the user is provided with a detection module. When a new digital asset certificate is written into the personal security kernel node (a certificate, namely, the digital asset certificate, is generated after the personal security kernel node of the user and the relied party node perform a service, and is written into a personal asset safe box of the personal security kernel node), the detection module detects this case, and displays an interface similar to that in FIG. 2B. The added digital asset certificate is listed in the interface, and a drop-down box for designating an inheritor personal security kernel node is provided below the added digital asset certificate. When an arrow on the right is clicked, a pull-down menu may be displayed. A list of all candidate inheritor personal security kernel node identifiers is provided in the pull-down menu, for the user to select.

In step 520, the inheritor personal security kernel node identifier designated by the user for the digital asset certificate is received on the interface.

When the user selects one inheritor personal security kernel node identifier from the pull-down menu, it is considered that the inheritor personal security kernel node identifier designated by the user for the digital asset certificate is received.

In step 530, a public key of an inheritor personal security kernel node corresponding to the designated inheritor personal security kernel node identifier is obtained.

Similar to step 420, in this step, the public key may be obtained by requesting from a dedicated certification authority (CA) server, or may be obtained from the blockchain, or may be obtained from the inheritor friend personal security kernel node through the social interaction system platform. Therefore, details are not described again.

In step 540, the added digital asset certificate is signed with the corresponding obtained public key of the inheritor personal security kernel node corresponding to the designated inheritor personal security kernel node identifier, to obtain a signature made on the added digital asset certificate by using the public key of the corresponding inheritor personal security kernel node.

This step is similar to step 430, and includes the process of generating a digest of the added digital asset certificate according to the predetermined digest algorithm, and encrypting the digest with the corresponding obtained public key of the inheritor personal security kernel node corresponding to the designated inheritor personal security kernel node identifier, In step 550, the designated inheritor personal security kernel node identifier of the added digital asset certificate and the signature made on the added digital asset certificate by using the public key of the corresponding inheritor personal security kernel node are added to the will.

This step is similar to step 440, except that in step 550, the inheritor personal security kernel node identifier and the corresponding signature are added to the will only for the added digital asset certificate. Therefore, details are not described again.

In step 560, current signature made by using the obtained public key of the authoritative entity node is removed from the will.

The signature made on the generated will by using the public key of the authoritative entity node in 470 is a signature for the content in the will at the time when the will is generated, and the current content of the will further includes the content added in step 550, causing a change in signature inheritance. Therefore, a new signature needs to be made. However, the signature in the will is not a part of a signature basis. When a new signature of the will is formed by using the public key of the authoritative entity node, the original signature is first removed. On this basis, the current content in the will is signed by using the obtained public key of the authoritative entity node. In this case, the current content includes the content added in step 550.

In step 570, the current content in the will is signed with the obtained public key of the authoritative entity node, and an obtained signature is put into the will.

In the foregoing process, when a digital asset certificate of the user is added after the will is generated, a simple and feasible will updating manner is provided, to avoid the problem that some newly added digital asset certificates in the will may not have inheritors in the future.

Figure 8:
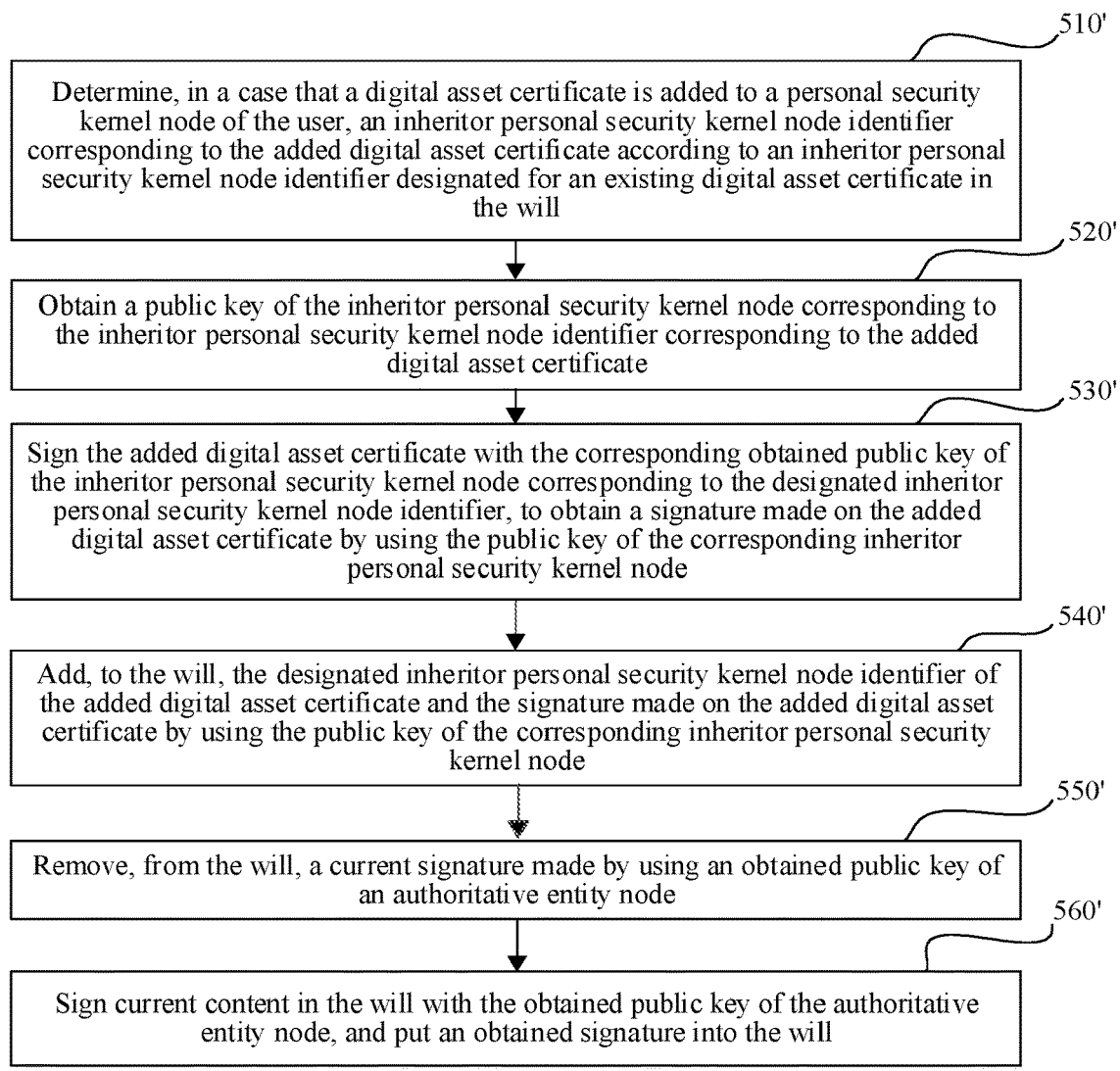
FIG. 8 is a flowchart of a process of updating a will according to an embodiment of this disclosure.

In response to that inheritor personal security kernel node identifiers of the digital asset certificates are automatically supplemented for the newly added digital asset certificates, in an embodiment, as shown in FIG. 8, the will is updated by the personal security kernel node of the user by using the following process:

Step 510'. Determine, in response to that a digital asset certificate is added to the personal security kernel node of the user, an inheritor personal security kernel node identifier corresponding to the added digital asset certificate according to an inheritor personal security kernel node identifier designated for an existing digital asset certificate in the will.

Step 520'. Obtain the public key of the inheritor personal security kernel node corresponding to the inheritor personal security kernel node identifier corresponding to the added digital asset certificate.

Step 530'. Sign the added digital asset certificate with the corresponding obtained public key of the inheritor personal security kernel node corresponding to the designated inheritor personal security kernel node identifier, to obtain a signature made on the added digital asset certificate by using the public key of the corresponding inheritor personal security kernel node.

Step 540'. Add, to the will, the designated inheritor personal security kernel node identifier of the added digital asset certificate and the signature made on the added digital asset certificate by using the public key of the corresponding inheritor personal security kernel node.

Step 550'. Remove, from the will, the current signature made by using the obtained public key of the authoritative entity node.

Step 560'. Sign current content in the will with the obtained public key of the authoritative entity node, and put an obtained signature into the will.

The foregoing steps are described below in detail.

In step 510', in response to that a digital asset certificate is added to the personal security kernel node of the user, an inheritor personal security kernel node identifier corresponding to the added digital asset certificate is determined according to an inheritor personal security kernel node identifier designated for an existing digital asset certificate in the will.

The method of determining the added digital asset certificate in the personal security kernel node of the user is the same as that in step 510.

In an embodiment, the determining the inheritor personal security kernel node identifier corresponding to the added digital asset certificate according to an inheritor personal security kernel node identifier designated for an existing digital asset certificate in the will includes:

obtaining a type of the added digital asset certificate;

searching the will for inheritor personal security kernel node identifiers already designated for digital asset certificates of the same type; and determining, in response to that the inheritor personal security kernel node identifiers already designated for the digital asset certificates of the same type in the will are consistent, the inheritor personal security kernel node identifier already designated for the digital asset certificates of the same type in the will as the inheritor personal security kernel node identifier corresponding to the added digital asset certificate.

Because the digital asset certificate includes a type field of the digital asset certificate, the type of the added digital asset certificate may be obtained from the type field of the digital asset certificate.

For example, if the type of the added digital asset certificate is a financing product, the will is searched to obtain inheritor personal security kernel node identifiers already designated for digital asset certificates of the financing product type. If there are five existing digital asset certificates of the financing product type in the will, there are five inheritor personal security kernel node identifiers designated for the digital asset certificates, but the five identifiers may be the same inheritor personal security kernel node identifier. That is, the inheritor personal security kernel node identifiers already designated for the digital asset certificates of the same type in the will are consistent. In this case, it is possible that the user intends to designate the same inheritor personal security kernel node for the newly added digital asset certificate. Therefore, the inheritor personal security kernel node identifier already designated for the digital asset certificates of the same type in the will is determined as the inheritor personal security kernel node identifier corresponding to the added digital asset certificate.

In an embodiment, the determining the inheritor personal security kernel node identifier corresponding to the added digital asset certificate according to an inheritor personal security kernel node identifier designated for an existing digital asset certificate in the will further includes:

determining, in response to that the inheritor personal security kernel node identifiers already designated for the digital asset certificates of the same type in the will are inconsistent, an inheritor personal security kernel node identifier that appears most frequently in the plurality of inheritor personal security kernel node identifiers already designated for the digital asset certificates of the same type in the will as the inheritor personal security kernel node identifier corresponding to the added digital asset certificate.

For example, if there are five existing digital asset certificates of the financing product type in the will, there are five inheritor personal security kernel node identifiers designated for the digital asset certificates, where an identifier of an inheritor personal security kernel node A appears twice, and an identifier of an inheritor personal security kernel node B appears three times. In this case, the identifier that appears more frequently may be the identifier that the user intends to designate. Therefore, an inheritor personal security kernel node identifier that appears most frequently in the five inheritor personal security kernel node identifiers already designated for the digital asset certificates of the same type in the will, that is, the identifier of the inheritor personal security kernel node A, is automatically determined as the inheritor personal security kernel node identifier corresponding to the added digital asset certificate.

In this embodiment, the inheritor personal security kernel node identifier designated for the newly added digital asset certificate is determined based on the inheritor personal security kernel node identifiers already designated for the digital asset certificates of the same type. Because the user tends to designate the same inheritor personal security kernel node for the digital asset certificates of the same type, the accuracy of automatically designating the inheritor personal security kernel node identifier is improved in this embodiment.

In addition, if the digital asset certificates of the same type are not found in the will, in a manner similar to step 510 and step 520, the user may manually select an inheritor personal security kernel node identifier corresponding to the digital asset certificate to be added.

In an embodiment, the determining the inheritor personal security kernel node identifier corresponding to the added digital asset certificate according to an inheritor personal security kernel node identifier designated for an existing digital asset certificate in the will includes:

obtaining a service relied party node identifier of the added digital asset certificate;

searching the will for inheritor personal security kernel node identifiers already designated for digital asset certificates corresponding to the same service relied party node identifier; and determining, in response to that the inheritor personal security kernel node identifiers already designated for the digital asset certificates corresponding to the same service relied party node identifier in the will are consistent, the inheritor personal security kernel node identifier already designated for the digital asset certificates corresponding to the same service relied party node identifier in the will as the inheritor personal security kernel node identifier corresponding to the added digital asset certificate.

Because the digital asset certificate includes a service relied party node identifier field, the service relied party node identifier corresponding to the added digital asset certificate may be obtained from the relied party node identifier field.

For example, the added digital asset certificate is a financing product purchased from a financial management company A. Therefore, the service relied party node identifier is a terminal identifier of the financial management company A. Five inheritor personal security kernel node identifiers designated for the digital asset certificates (for example, the financing products) formed in the terminal of the financial management company A are found in the will, but the five identifiers may be the same inheritor personal security kernel node identifier. In this case, the same inheritor personal security kernel node identifier is used as the inheritor personal security kernel node identifier corresponding to the added digital asset certificate.

In an embodiment, the determining the inheritor personal security kernel node identifier corresponding to the added digital asset certificate according to an inheritor personal security kernel node identifier designated for an existing digital asset certificate in the will further includes:

determining, in response to that the inheritor personal security kernel node identifiers already designated for the digital asset certificates corresponding to the same service relied party node identifier in the will are inconsistent, an inheritor personal security kernel node identifier that appears most frequently in the plurality of inheritor personal security kernel node identifiers already designated for the digital asset certificates corresponding to the same service relied party node identifier in the will as the inheritor personal security kernel node identifier corresponding to the added digital asset certificate.

For example, if five existing financing products in the will are purchased from a financial management company A, there are five inheritor personal security kernel node identifiers designated for the digital asset certificates, where an identifier of an inheritor personal security kernel node A appears twice, and an identifier of an inheritor personal security kernel node B appears three times. In this case, the identifier that appears more frequently may be the identifier that the user intends to designate. Therefore, an inheritor personal security kernel node identifier that appears most frequently in the five inheritor personal security kernel node identifiers already designated for the digital asset certificates corresponding to the same service relied party node identifier in the will, that is, the identifier of the inheritor personal security kernel node A, is automatically determined as the inheritor personal security kernel node identifier corresponding to the added digital asset certificate.

In this embodiment, the inheritor personal security kernel node identifier designated for the newly added digital asset certificate is determined based on the inheritor personal security kernel node identifiers already designated for the digital asset certificates corresponding to the same service relied party node identifier. Because the user tends to designate the same inheritor personal security kernel node for the digital asset certificates corresponding to the same service relied party node, the accuracy of automatically designating the inheritor personal security kernel node identifier is improved in this embodiment.

In step 520', the public key of the inheritor personal security kernel node corresponding to the inheritor personal security kernel node identifier corresponding to the added digital asset certificate is obtained.

Similar to step 530, in this step, the public key may be obtained by requesting from a dedicated certification authority (CA) server, or may be obtained from the blockchain, or may be obtained from the inheritor friend personal security kernel node through the social interaction system platform. Therefore, details are not described again.

In step 530', the added digital asset certificate is signed with the corresponding obtained public key of the inheritor personal security kernel node corresponding to the designated inheritor personal security kernel node identifier, to obtain a signature made on the added digital asset certificate by using the public key of the corresponding inheritor personal security kernel node.

This step is similar to step 540. Therefore, details are not described again.

In step 540', the designated inheritor personal security kernel node identifier of the added digital asset certificate and the signature made on the added digital asset certificate by using the public key of the corresponding inheritor personal security kernel node are added to the will.

This step is similar to step 550. Therefore, details are not described again.

In step 550', the current signature made by using the obtained public key of the authoritative entity node is removed from the will.

This step is similar to step 560. Therefore, details are not described again.

In step 560', current content in the will is signed with the obtained public key of the authoritative entity node, and an obtained signature is put into the will.

This step is similar to step 570. Therefore, details are not described again.

In this embodiment, the inheritor personal security kernel node identifier is allocated to the newly added digital asset certificate automatically according to the existing digital asset certificate in the user personal security kernel node, thereby improving the automation degree of updating the will.

In addition, if the digital asset certificates corresponding to the same service relied party node identifier are not found in the will, in a manner similar to step 510 and step 520, the user may manually select an inheritor personal security kernel node identifier corresponding to the digital asset certificate to be added.

Figure 9:
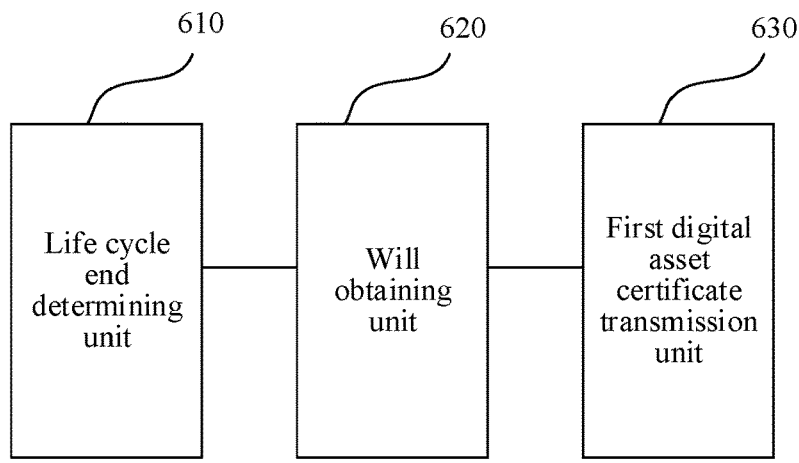
FIG. 9 is a block diagram of an authoritative entity node according to an embodiment of this disclosure.

As shown in FIG. 9, according to an embodiment, an authoritative entity node is further provided, including:
  an end of life cycle determining unit 610, configured to determine that a life cycle of a user ends;
  a will obtaining unit 620, configured to obtain a will of the user, the will including a user personal security kernel node identifier, each inheritor personal security kernel node identifier, a signature made on each digital asset certificate by using a public key of a corresponding inheritor personal security kernel node, and a signature made on the will by using a public key of the authoritative entity node; and
  a first digital asset certificate signature transmission unit 630, configured to trigger, in response to that the signature made on the will by using the public key of the authoritative entity node is successfully verified by using a private key of the authoritative entity node, transmission of the signature made on the each digital asset certificate in the will by using the public key of the corresponding inheritor personal security kernel node to the inheritor personal security kernel node corresponding to the each inheritor personal security kernel node identifier in the will, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

In an embodiment, the end of life cycle determining unit 610 is further configured to:
  determine, in response to an end of life cycle notification from an investigation node, that the life cycle of the user ends.

In an embodiment, the end of life cycle determining unit 610 is further configured to:
  receive a startup request of a startup node;
  transmit inheritance program startup confirmation requests to a plurality of certifier nodes through a social interaction system platform; and
  determine that the life cycle of the user ends in response to that replies of the plurality of certifier nodes meet a predetermined condition.

In an embodiment, the determining that the life cycle of the user ends in response to that replies of the plurality of certifier nodes meet a predetermined condition includes:
  determining that the life cycle of the user ends, in response to that the replies of the plurality of certifier nodes meet the predetermined condition and an end of life cycle notification from an investigation node is received.

In an embodiment, the will further includes an authoritative entity node identifier designated for execution of the will. That the signature made on the will by using the public key of the authoritative entity node is successfully verified by using the private key of the authoritative entity node includes:
  obtaining the authoritative entity node identifier designated in the will for execution of the will; and
  determining that the signature made on the will by using the public key of the authoritative entity node is successfully verified by using a private key of the authoritative entity node, in response to that the authoritative entity node identifier designated in the will for execution of the will is an identifier of the authoritative entity node that currently executes the method.

In an embodiment, the determining that the signature made on the will by using the public key of the authoritative entity node is successfully verified by using a private key of the authoritative entity node, in response to that the authoritative entity node identifier designated in the will for execution of the will is an identifier of the authoritative entity node that currently executes the method includes:

decrypting, by using the private key of the authoritative entity node, the signature made on the will by using the public key of the authoritative entity node, to obtain a will digest generated after the decryption, in response to that the authoritative entity node identifier designated in the will for execution of the will is the identifier of the authoritative entity node that currently executes the method;

generating a second will digest; and determining, in response to that the will digest generated after the decryption is consistent with the generated second will digest, that the signature made on the will by using the public key of the authoritative entity node is successfully verified by using the private key of the authoritative entity node.

In an embodiment, the inherited digital asset certificate includes a service relied party node identifier on which the digital asset certificate relies, so that the inheritor personal security kernel node and a service relied party node corresponding to the service relied party node identifier generate an updated digital asset certificate between an inheritor node and the service relied party node according to the inherited digital asset certificate.

In an embodiment, the will further includes applicable inheritance laws of the will, and the triggering transmission of the signature made on the each digital asset certificate in the will by using the public key of the corresponding inheritor personal security kernel node to the inheritor personal security kernel node corresponding to the each inheritor personal security kernel node identifier in the will includes:

triggering transmission of the signature made on the each digital asset certificate by using the public key of the corresponding inheritor personal security kernel node in the will and the applicable inheritance laws of the will to the inheritor personal security kernel node corresponding to the each inheritor personal security kernel node identifier in the will, so that after obtaining the inherited digital asset certificate, the inheritor personal security kernel node performs a process corresponding to the applicable inheritance laws.

In an embodiment, the authoritative entity node further includes:

an identity corresponding law determining unit, configured to determine, according to an identity of a personal security kernel node of the user, a law corresponding to the identity in response to that the will of the user is unavailable;

a kinship obtaining unit, configured to obtain kinship of the user;

a digital asset certificate obtaining unit, configured to obtain digital asset certificates of the user;

an inheritor personal security kernel node identifier determining unit, configured to determine, for each obtained digital asset certificate of the user, an inheritor personal security kernel node identifier corresponding to the each digital asset certificate according to the determined law and the kinship;

an inheritor personal security kernel node public key obtaining unit, configured to obtain a public key of an inheritor personal security kernel node corresponding to the determined inheritor personal security kernel node identifier; and a second digital asset certificate signature transmission unit, configured to: sign the each digital asset certificate of the user with the public key of the corresponding inheritor personal security kernel node, and transmit an obtained signature to the corresponding inheritor personal security kernel node, so that the inheritor personal security kernel node decrypts the signature with a private key of the inheritor personal security kernel node, to obtain a digest of the digital asset certificate, and obtains the inherited digital asset certificate according to the obtained digest of the digital asset certificate.

In an embodiment, the will is generated by a personal security kernel node of the user by using the following process:

receiving, for a digital asset certificate in the personal security kernel node of the user, an inheritor personal security kernel node identifier designated by the user for the digital asset certificate;

obtaining a public key of an inheritor personal security kernel node corresponding to the designated inheritor personal security kernel node identifier;

signing each digital asset certificate with the corresponding obtained public key of the inheritor personal security kernel node corresponding to the designated inheritor personal security kernel node identifier, to obtain a signature made on the each digital asset certificate by using the public key of the corresponding inheritor personal security kernel node;

putting the identifier of the personal security kernel node of the user, each inheritor personal security kernel node identifier, and the signature made on the each digital asset certificate by using the public key of the corresponding inheritor personal security kernel node into the will;

receiving an authoritative entity node identifier designated by the user for execution of the will;

obtaining a public key of an authoritative entity node corresponding to the authoritative entity node identifier; and signing current content in the will with the obtained public key of the authoritative entity node, and putting an obtained signature into the will.

In an embodiment, before the will is signed with the obtained public key of the authoritative entity node and put into the will, the process of generating the will further includes:

putting the designated authoritative entity node identifier into the will.

In an embodiment, after being generated, the will is configured by using the following process:

displaying a security mode list, the security mode list including a first security mode, a second security mode, and a third security mode, where in the first secure mode, the will is stored in a user personal security kernel node client; in the second security mode, the will is stored in a user personal security kernel node client and server; and in the third security mode, the will is stored in a user personal security kernel node server and published on a blockchain;

storing the will in the user personal security kernel node client in response to selecting the first security mode in the security mode list by the user;

storing the will in the user personal security kernel node client and server in response to selecting the second security mode in the security mode list by the user; and storing the will in the user personal security kernel node server, and publishing the will on the blockchain in response to selecting the third security mode in the security mode list by the user;

In an embodiment, the will is updated by the personal security kernel node of the user by using the following process:

displaying, to the user in response to that a digital asset certificate is added to the personal security kernel node of the user, an interface for designating an inheritor personal security kernel node identifier of the digital asset certificate;

receiving, on the interface, an inheritor personal security kernel node identifier designated by the user for the digital asset certificate;

obtaining a public key of an inheritor personal security kernel node corresponding to the designated inheritor personal security kernel node identifier;

signing the added digital asset certificate with the corresponding obtained public key of the inheritor personal security kernel node corresponding to the designated inheritor personal security kernel node identifier, to obtain a signature made on the added digital asset certificate by using the public key of the corresponding inheritor personal security kernel node;

adding, to the will, the designated inheritor personal security kernel node identifier of the added digital asset certificate and the signature made on the added digital asset certificate by using the public key of the corresponding inheritor personal security kernel node;

removing, from the will, the current signature made by using the obtained public key of the authoritative entity node; and signing the current content in the will with the obtained public key of the authoritative entity node, and putting an obtained signature into the will.

In an embodiment, the will is updated by the personal security kernel node of the user by using the following process:

determining, in response to that a digital asset certificate is added to the personal security kernel node of the user, an inheritor personal security kernel node identifier corresponding to the added digital asset certificate according to an inheritor personal security kernel node identifier designated for an existing digital asset certificate in the will;

obtaining a public key of an inheritor personal security kernel node corresponding to the inheritor personal security kernel node identifier corresponding to the added digital asset certificate;

signing the added digital asset certificate with the corresponding obtained public key of the inheritor personal security kernel node corresponding to the designated inheritor personal security kernel node identifier, to obtain a signature made on the added digital asset certificate by using the public key of the corresponding inheritor personal security kernel node;

adding, to the will, the designated inheritor personal security kernel node identifier of the added digital asset certificate and the signature made on the added digital asset certificate by using the public key of the corresponding inheritor personal security kernel node;

removing, from the will, the current signature made by using the obtained public key of the authoritative entity node; and signing the current content in the will with the obtained public key of the authoritative entity node, and putting an obtained signature into the will.

Figure 10:
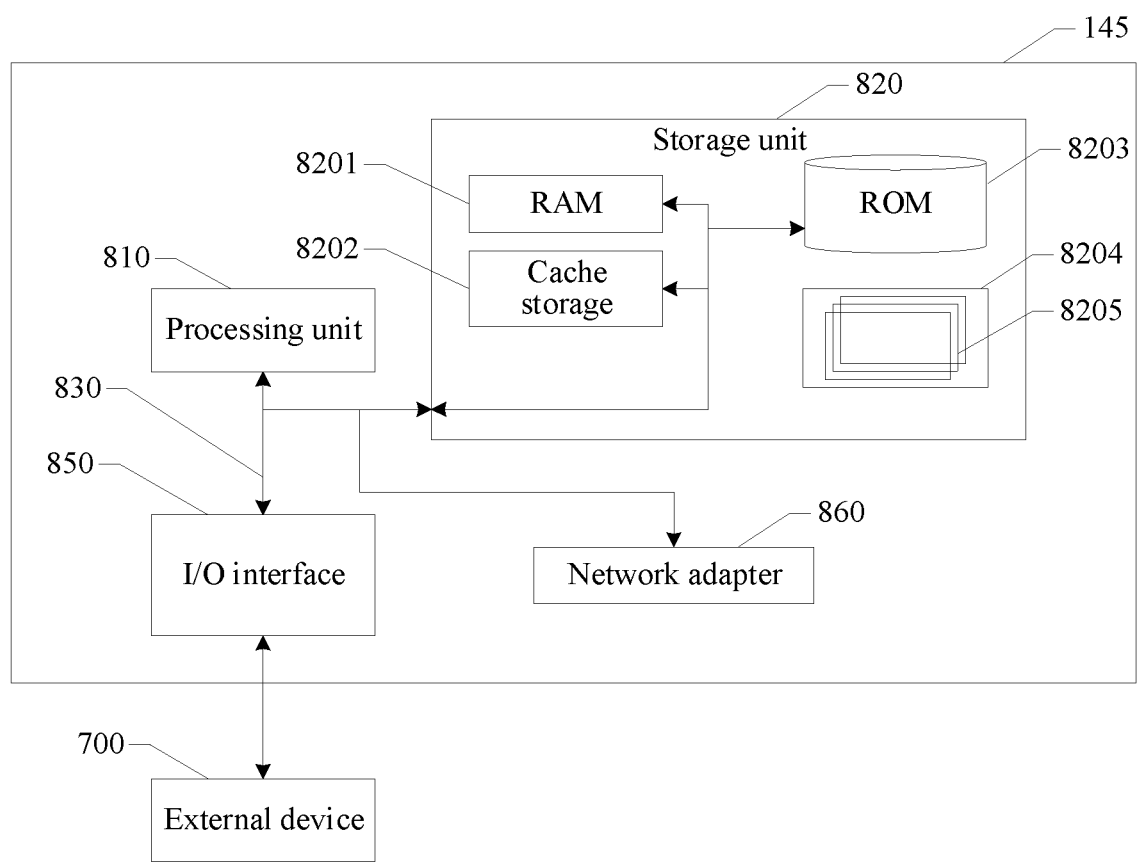
FIG. 10 is a hardware diagram of an authoritative entity node according to an embodiment of this disclosure.

The information processing method in digital asset certificate inheritance transfer according to this embodiment of this disclosure may be implemented by the authoritative entity node 145 in FIG. 10.

As shown in FIG. 10, the authoritative entity node 145 is represented in a form of a general-purpose computing device. Components of the authoritative entity node 145 may include, but not limited to: at least one processing unit 810, at least one storage unit 820, and a bus 830 connected to different system components (including the storage unit 820 and the processing unit 810).

The storage unit stores program code, and the program code may be executed by the processing unit 810, so that the processing unit 810 performs the steps according to various exemplary implementations of the present disclosure described in the descriptions of the foregoing exemplary methods of the specification. For example, the processing unit 810 may perform each step shown in FIG. 3.

The storage unit 820 may include a readable medium in the form of a volatile storage unit, for example, a random access memory (RAM) unit 8201 and/or a cache storage unit 8202, and may further include a read-only memory (ROM) unit 8203.

The storage unit 820 may further include a program/utility tool 8204 having a group of (at least one) program modules 8205. Such a program module 8205 includes, but is not limited to, a social interaction system, one or more application programs, other program modules, and program data. Each or a combination of these examples may include implementation of a network environment.

The bus 830 may indicate one or more of several types of bus structures, including a storage unit bus or storage unit controller, a peripheral bus, an accelerated graphics port, a processing unit, or a local bus using any of a plurality of bus structures.

The authoritative entity node 145 may alternatively communicate with one or more external devices 700 (for example, a keyboard, a pointing device, and a Bluetooth device), may alternatively communicate with one or more devices that can enable a user to interact with the authoritative entity node 145, and/or may communicate with any device (for example, a router or a modem) that enables the authoritative entity node 145 to communicate with one or more other computing devices. Such communication may be performed by using an input/output (I/O) interface 850. In addition, the authoritative entity node 145 may further communicate with one or more networks such as a local area network (LAN), a wide area network (WAN), and/or a public network (such as the Internet) through a network adapter 860. As shown in the figure, the network adapter 860 communicates with other modules of the authoritative entity node 145 by using the bus 830. It is to be understood that although not shown in the figure, other hardware and/or software modules may be used in combination with the authoritative entity node 145, including, but not limited to microcode, a device drive, a redundancy processing unit, an external disk drive array, a RAID system, a tape drive, a data backup and storage system, and the like.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the methods described in the implementations of this disclosure.

In an exemplary embodiment of this disclosure, a computer program medium is further provided, storing computer-readable instructions, the computer-readable instructions, when executed by a processor of a computer, causing the computer to perform the method described in the foregoing method embodiments.

In an exemplary embodiment of this disclosure, a computer program product including instructions is further provided, the instructions, when run on a computer, causing the computer to perform the method described in the foregoing method embodiment parts.

The computer program product may use a portable compact disk read-only memory (CD-ROM) and includes program code, and may run on a terminal device such as a personal computer. However, the program product in the present disclosure is not limited thereto. In this specification, the readable storage medium may be any tangible medium including or storing a program, and the program may be used by or used in combination with an instruction execution system, an apparatus, or a device.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

The computer-readable signal medium may include a data signal being in a baseband or transmitted as a part of a carrier, which carries readable program code. A data signal propagated in such a way may assume a plurality of forms, including, but not limited to, an electromagnetic signal, an optical signal, or any appropriate combination thereof. The readable storage medium may alternatively be any readable medium other than a readable storage medium, and the readable storage medium may be used to send, propagate, or transmit a program used by or in combination with an instruction execution system, apparatus, or device.

The program code included in the readable storage medium may be transmitted by using any suitable medium, including but not limited to a wireless medium, a wired medium, an optical cable, RF, or any appropriate combination thereof.

The program code used for executing the operations of the present disclosure may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In cases involving a remote computing device, the remote computing device may be connected to a user computing device through any type of network including a local area network (LAN) or a wide area network (WAN), or may be connected to an external computing device (for example, through the Internet by using an Internet service provider).

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In addition, although the various steps of the method in this disclosure are described in a specific order in the accompanying drawings, this does not require or imply that the steps are bound to be performed in the specific order, or all the steps shown are bound to be performed to achieve the desired result. Additionally or alternatively, some steps may be omitted, a plurality of steps may be combined into one step for execution, and/or one step may be decomposed into a plurality of steps for execution, and the like.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a mobile terminal, a network device, or the like) to perform the methods according to the implementations of this disclosure.

After considering the specification and practicing the present disclosure, a person skilled in the art may easily conceive of other implementations of this disclosure. This disclosure is intended to cover any variations, uses, or adaptive changes of this application. These variations, uses, or adaptive changes follow the general principles of this application and include common general knowledge or common technical means in the art, which are not disclosed in this application. The specification and the embodiments are merely considered as examples, and the actual scope and the spirit of this application are pointed out by the following claims.

What is claimed is:

1. An information processing method, comprising:
obtaining an electronic will of a user, the electronic will comprising:
a user personal security kernel node identifier;
at least one inheritor personal security kernel node identifier;
at least one signature made on at least one digital asset certificate by using a public key of at least one inheritor personal security kernel node; and
a signature made on the electronic will by using a public key of an authoritative entity node; and
triggering, after the signature made on the electronic will is successfully verified by using a private key of the authoritative entity node, transmission of the at least one signature made on the at least one digital asset certificate to the at least one inheritor personal security kernel node corresponding to the at least one inheritor personal security kernel node identifier, wherein the signature made on the at least one digital asset certificate is configured to be decrypted by the at least one inheritor personal security kernel node with a private key of the at least one inheritor personal security kernel node to generate a digest of the digital asset certificate and to generate an inherited digital asset certificate according to the digest of the digital asset certificate.

2. The method according to claim 1, further comprising determining that a life cycle of the user ends, comprising:
determining that the life cycle of the user ends in response to a notification indicating end of the life cycle from an investigation node.

3. The method according to claim 1, further comprising determining that a life cycle of the user ends, comprising:
receiving a startup request of a startup node;
transmitting inheritance program startup confirmation requests to a plurality of certifier nodes through a social interaction system platform; and
determining that the life cycle of the user ends in response to that replies of the plurality of certifier nodes meet a predetermined condition.

4. The method according to claim 3, wherein determining that the life cycle of the user ends in response to that replies of the plurality of certifier nodes meet the predetermined condition comprises:
determining that the life cycle of the user ends in response to that the replies of the plurality of certifier nodes meet the predetermined condition and a notification indicating end of the life cycle from an investigation node is received.

5. The method according to claim 1, wherein the electronic will further comprises an authoritative entity node identifier designated for execution of the electronic will and wherein the information processing method further comprises:
obtaining the authoritative entity node identifier designated in the electronic will; and
determining that the signature made on the electronic will by using the public key of the authoritative entity node is successfully verified by using the private key of the authoritative entity node when the authoritative entity node identifier designated in the electronic will matches the authoritative entity node that currently processes the electronic will.

6. The method according to claim 5, wherein determining that the signature made on the electronic will by using the public key of the authoritative entity node is successfully verified by using the private key of the authoritative entity node when the authoritative entity node identifier designated in the electronic will matches the authoritative entity node that currently processes the electronic will comprises:
decrypting, by using the private key of the authoritative entity node, the signature made on the electronic will to obtain a first will digest following the determination that the authoritative entity node identifier designated in the electronic will matches the authoritative entity node that currently processes the will;
generating a second will digest; and
determining, in response to that the first will digest is consistent with the second will digest, that the signature made on the electronic will is successfully verified by using the private key of the authoritative entity node.

7. The method according to claim 1, wherein the inherited digital asset certificate comprises a relied party node identifier of a relied party node on which the digital asset certificate relies, wherein the inherited digital asset certificate is configured to be used to generate an updated digital asset certificate between an inheritor node and the relied party node by the at least one inheritor personal security kernel node and the relied party node corresponding to the relied party node identifier.

8. The method according to claim 1, wherein the electronic will further comprises applicable inheritance laws of the electronic will and wherein triggering transmission of the at least one signature made on the at least one digital asset certificate to the at least one inheritor personal security kernel node comprises:
triggering transmission of the at least one signature made on the at least one digital asset certificate and the applicable inheritance laws of the electronic will to the at least one inheritor personal security kernel node, the applicable inheritance laws being transmitted to configure a process performed by the inheritor personal security kernel node.

9. The method according to claim 1, further comprising generating the electronic will by using steps comprising:
receiving the at least one inheritor personal security kernel node identifier designated by the user for the at least one digital asset certificate;
obtaining the public key of the at least one inheritor personal security kernel node corresponding to the at least one inheritor personal security kernel node identifier;
signing the at least one digital asset certificate with the public key of the at least one inheritor personal security kernel node corresponding to the at least one inheritor personal security kernel node identifier to obtain the signature made on the at least one digital asset certificate;
putting the at least one user personal security kernel node identifier, the at least one inheritor personal security kernel node identifier, and the at least one signature made on the at least one digital asset certificate into the electronic will;
receiving an authoritative entity node identifier designated by the user for execution of the electronic will;

obtaining the public key of the authoritative entity node corresponding to a judicial institution node identifier; and signing current content in the electronic will with the public key of the authoritative entity node to generate the signature made on the electronic will by using the public key of the authoritative entity node.

10. The method according to claim 9, further comprising:

displaying a security mode list, the security mode list comprising a first security mode, a second security mode, and a third security mode to be selected by the user;

storing the electronic will in a user personal security kernel node client in response to selection of the first security mode in the security mode list by the user;

storing the electronic will in the user personal security kernel node client and a user personal security kernel node server in response to selection of the second security mode in the security mode list by the user; and storing the electronic will in the user personal security kernel node server, and publishing the will on a blockchain in response to selection of the third security mode in the security mode list by the user.

11. The method according to claim 9, further comprising updating the electronic will by the personal security kernel node of the user by steps, comprising:

determining, in response to that an extra digital asset certificate is added to the personal security kernel node of the user, a newly-designated inheritor personal security kernel node identifier corresponding to the extra digital asset certificate according to one of the at least one inheritor personal security kernel node identifier designated for one of the at least one digital asset certificate in the electronic will;

obtaining an extra public key of a newly-designated inheritor personal security kernel node corresponding to the newly-designated inheritor personal security kernel node identifier corresponding to the extra digital asset certificate;

signing the extra digital asset certificate with the extra public key of the newly-designated inheritor personal security kernel node corresponding to the newly-designated inheritor personal security kernel node identifier to obtain a signature made on the extra digital asset certificate by using the extra public key of the newly-designated inheritor personal security kernel node;

adding, to the electronic will, the newly-designated inheritor personal security kernel node identifier of the extra digital asset certificate and the signature made on the extra digital asset certificate;

removing, from the electronic will, a current signature made on the electronic will by using the public key of the authoritative entity node; and signing the current content in the electronic will with the public key of the authoritative entity node to obtain an updated signature made on the electronic will.

12. An information processing method, comprising:

obtaining, in response to that a digital asset certificate is added to a personal security kernel node of a user, an inheritor personal security kernel node identifier corresponding to the added digital asset certificate and a public key of an inheritor personal security kernel node corresponding to the inheritor personal security kernel node identifier;

signing the added digital asset certificate with the public key of the inheritor personal security kernel node to obtain a signature made on the added digital asset certificate by using the public key of the inheritor personal security kernel node;

adding the inheritor personal security kernel node identifier and the signature made on the added digital asset certificate to an electronic will of the user, the electronic will comprising an existing signature made by using a public key of an authoritative entity node;

removing, from the electronic will, the existing signature made by using the public key of the authoritative entity node; and signing current content in the electronic will with the public key of the authoritative entity node to obtain a updated signature made on the electronic will.

13. The method according to claim 12, wherein obtaining the inheritor personal security kernel node identifier corresponding to the added digital asset certificate and the public key of the inheritor personal security kernel node corresponding to the inheritor personal security kernel node identifier comprises:

displaying, to the user, an interface for designating the inheritor personal security kernel node identifier of the added digital asset certificate;

receiving, on the interface, the inheritor personal security kernel node identifier designated by the user for the added digital asset certificate; and obtaining the public key of the inheritor personal security kernel node corresponding to the inheritor personal security kernel node identifier designated by the user.

14. The method according to claim 13, wherein obtaining the public key of the inheritor personal security kernel node corresponding to the inheritor personal security kernel node identifier designated by the user comprises at least one of:

requesting to obtain, from a certification authority server in a blockchain, the public key of the inheritor personal security kernel node corresponding to the inheritor personal security kernel node identifier designated by the user; or obtaining, from the blockchain, the public key of the inheritor personal security kernel node corresponding to the inheritor personal security kernel node identifier designated by the user, wherein the public key of the inheritor personal security kernel node is generated by the inheritor personal security kernel node and is correspondingly recorded on the blockchain with a public key identifier of the inheritor personal security kernel node; or transmitting a public key obtaining request to a personal security kernel node of a friend of the inheritor through a social interaction system platform, the public key obtaining request comprising the inheritor personal security kernel node identifier designated by the user, and receiving, from the personal security kernel node of the friend of the inheritor, the public key of the inheritor personal security kernel node corresponding to an inheritor friend personal security kernel node identifier designated by the user.

15. The method according to claim 12, wherein obtaining the inheritor personal security kernel node identifier corresponding to the added digital asset certificate and the public key of the inheritor personal security kernel node corresponding to the inheritor personal security kernel node identifier comprises:

determining the inheritor personal security kernel node identifier corresponding to the added digital asset certificate according to an existing inheritor personal security kernel node identifier designated for an existing digital asset certificate in the electronic will; and obtaining the public key of the inheritor personal security kernel node corresponding to the inheritor personal security kernel node identifier corresponding to the added digital asset certificate.

16. The method according to claim 15, wherein determining the inheritor personal security kernel node identifier corresponding to the added digital asset certificate according to the existing inheritor personal security kernel node identifier designated for the existing digital asset certificate in the electronic will comprises:
  determining either one of the following existing inheritor personal security kernel node identifier as the inheritor personal security kernel node identifier corresponding to the added digital asset certificate:
  one of at least one existing inheritor personal security kernel node identifiers previously designated for the digital asset certificate of a same type in the electronic will if the at least one existing inheritor personal security kernel node identifiers previously designated for the digital asset certificate of the same type in the electronic will are consistent;
  one of the at least one existing inheritor personal security kernel node identifiers that appears most frequently among the at least one existing inheritor personal security kernel node identifiers previously designated for the digital asset certificate of the same type in the electronic will if the at least one existing inheritor personal security kernel node identifiers previously designated for the digital asset certificate of the same type in the electronic will are inconsistent;
  one of at least one existing inheritor personal security kernel node identifiers previously designated for the digital asset certificate corresponding to a same relied party node identifier in the electronic will if the at least one existing inheritor personal security kernel node identifiers previously designated for the digital asset certificate corresponding to the same relied party node identifier in the electronic will are consistent; or
  one of the at least one existing inheritor personal security kernel node identifiers that appears most frequently among the at least one existing inheritor personal security kernel node identifiers previously designated for the digital asset certificate corresponding to the same relied party node identifier in the electronic will if the at least one existing inheritor personal security kernel node identifiers previously designated for the digital asset certificate corresponding to the same relied party node identifier in the electronic will are inconsistent.

17. The method according to claim 12, wherein signing the added digital asset certificate with the public key of the inheritor personal security kernel node comprises:
  generating a digest of the added digital asset certificate according to a predetermined digest algorithm; and
  encrypting the digest of the added digital asset certificate with the public key of the inheritor personal security kernel node.

18. A computer system, comprising:
  a memory, storing computer-readable instructions; and
  a processor, configured to read the computer-readable instructions stored in the memory to perform the method of claim 1.

19. A non-transitory computer-readable program storage medium, storing computer-readable instructions, the computer-readable instructions are configured to, when executed by a processor of a computer, cause the computer to perform the method of claim 1.

20. An information processing method, comprising:
  determining, according to an identity of a personal security kernel node of a user, a law corresponding to the identity;
  obtaining kinship of the user;
  obtaining at least one digital asset certificate of the user;
  determining at least one inheritor personal security kernel node identifier respectively corresponding to the at least one digital asset certificate according to the determined law and the kinship;
  obtaining at least one public key of at least one inheritor personal security kernel node respectively corresponding to the at least one determined inheritor personal security kernel node identifier;
  signing the at least one digital asset certificate of the user with the at least one public key of the at least one inheritor personal security kernel node to obtain at least one signature; and
  transmitting the at least one signature to the at least one inheritor personal security kernel node, wherein the signature is decrypted by the at least one inheritor personal security kernel node with a private key of the at least one inheritor personal security kernel node to obtain a digest of the at least one digital asset certificate and to obtain an inherited digital asset certificate according to the obtained digest of the at least one digital asset certificate.

* * * * *